United States Patent
Sokolov et al.

(10) Patent No.: US 11,276,076 B2
(45) Date of Patent: Mar. 15, 2022

(54) METHOD AND SYSTEM FOR GENERATING A DIGITAL CONTENT RECOMMENDATION

(71) Applicant: YANDEX EUROPE AG, Lucerne (CH)

(72) Inventors: Yevgeny Andreevich Sokolov, Belaya Kalitva (RU); Viktor Grigorievich Lamburt, Moscow (RU); Boris Dmitrievich Sharchilev, Moscow (RU); Nikita Leonidovich Senderovich, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 21 days.

(21) Appl. No.: 16/371,624

(22) Filed: Apr. 1, 2019

(65) Prior Publication Data

US 2020/0090247 A1    Mar. 19, 2020

(30) Foreign Application Priority Data

Sep. 14, 2018    (RU) .................... 2018132708

(51) Int. Cl.
*G06Q 30/00*    (2012.01)
*G06Q 30/02*    (2012.01)
(Continued)

(52) U.S. Cl.
CPC ......... *G06Q 30/0255* (2013.01); *G06N 20/00* (2019.01); *G06Q 30/0264* (2013.01); *G06Q 30/0269* (2013.01); *G06Q 30/0631* (2013.01)

(58) Field of Classification Search
CPC ............... G06Q 50/01; G06Q 30/0241; G06Q 30/0631; G06Q 30/0269; G06Q 30/0264;
(Continued)

(56) References Cited

U.S. PATENT DOCUMENTS

| 5,745,600 A | 4/1998 | Chen et al. |
| 7,007,242 B2 | 2/2006 | Suomela et al. |

(Continued)

FOREIGN PATENT DOCUMENTS

| CN | 103077220 A | 5/2013 |
| CN | 103167330 A | 6/2013 |

(Continued)

OTHER PUBLICATIONS

"The impact of ad positioning in search engine targeting: a multi-faceted decision problem," by Carsten D. Schultz, Electronic Commerce Research, New York: Springer Nature B.V., Jun. 29, 2018 (Year: 2018).*

(Continued)

*Primary Examiner* — Anne M Georgalas
(74) *Attorney, Agent, or Firm* — BCF LLP

(57) ABSTRACT

A method and a system for generating a digital content recommendation. The method comprises receiving a request for the digital content recommendation. Based on the request, a first content item and a second content item responsive to the request are selected, and a relevancy parameter and a completion parameter for each of the first content item and the second content item are determined. Based on the relevancy parameter and the completion parameter, the first content item and the second content item are ranked, and a digital content recommendation is generated based on the ranking of the first content item and the second content item.

9 Claims, 5 Drawing Sheets

(51) Int. Cl.
  *G06Q 30/06* (2012.01)
  *G06N 20/00* (2019.01)
(58) Field of Classification Search
  CPC ............ G06Q 30/0255; G06F 16/9535; G06F 16/24578; G06F 16/248; G06N 20/00
  See application file for complete search history.

(56) References Cited

U.S. PATENT DOCUMENTS

| | | | |
|---|---|---|---|
| 7,328,216 B2 | 2/2008 | Hofmann et al. | |
| 7,451,173 B1 | 11/2008 | Van et al. | |
| 7,502,789 B2 | 3/2009 | Yao et al. | |
| 7,540,051 B2 | 6/2009 | Gundersen et al. | |
| D607,463 S | 1/2010 | Krieter et al. | |
| 7,685,200 B2 | 3/2010 | Gunawardena et al. | |
| 7,685,232 B2 | 3/2010 | Gibbs et al. | |
| D613,300 S | 4/2010 | Chaudhri | |
| 7,849,076 B2 | 12/2010 | Zheng et al. | |
| 8,010,527 B2 | 8/2011 | Denoue et al. | |
| 8,225,195 B1 | 7/2012 | Bryar et al. | |
| 8,244,740 B2 | 8/2012 | Gruenhagen et al. | |
| 8,271,898 B1 | 9/2012 | Mattos et al. | |
| 8,285,602 B1 | 10/2012 | Yi et al. | |
| 8,290,818 B1 | 10/2012 | Levitan et al. | |
| 8,296,179 B1 * | 10/2012 | Rennison | G06Q 30/0251 705/14.53 |
| 8,301,623 B2 | 10/2012 | Chakrabarti et al. | |
| 8,386,955 B1 | 2/2013 | Weber et al. | |
| 8,412,726 B2 | 4/2013 | Yan et al. | |
| 8,429,184 B2 | 4/2013 | Ismalon | |
| D682,844 S | 5/2013 | Friedlander et al. | |
| 8,478,664 B1 | 7/2013 | Xavier et al. | |
| 8,478,750 B2 | 7/2013 | Rao et al. | |
| 8,510,252 B1 | 8/2013 | Gargi et al. | |
| D691,619 S | 10/2013 | Satterfield et al. | |
| 8,554,601 B1 | 10/2013 | Marsh et al. | |
| D693,833 S | 11/2013 | Inose et al. | |
| 8,583,418 B2 | 11/2013 | Silverman et al. | |
| 8,600,968 B2 | 12/2013 | Holenstein et al. | |
| 8,606,792 B1 | 12/2013 | Jackson et al. | |
| 8,655,829 B2 | 2/2014 | Flinn et al. | |
| 8,676,736 B2 | 3/2014 | Pilaszy et al. | |
| 8,683,374 B2 | 3/2014 | Vaughan et al. | |
| 8,712,937 B1 | 4/2014 | Bacus et al. | |
| 8,751,507 B2 | 6/2014 | Kim et al. | |
| 8,869,042 B2 | 10/2014 | Kast | |
| 8,886,797 B2 | 11/2014 | Gannu et al. | |
| 8,893,042 B2 | 11/2014 | Laurie et al. | |
| 8,893,043 B2 | 11/2014 | Dodson et al. | |
| 8,903,834 B2 | 12/2014 | Ciancutti et al. | |
| 8,910,070 B2 | 12/2014 | Goodger et al. | |
| 8,914,399 B1 | 12/2014 | Paleja et al. | |
| 8,935,258 B2 | 1/2015 | Svore et al. | |
| 8,972,391 B1 | 3/2015 | McDonnell et al. | |
| 8,972,865 B2 | 3/2015 | Hansen et al. | |
| 8,983,888 B2 | 3/2015 | Nice et al. | |
| 8,996,530 B2 | 3/2015 | Luvogt et al. | |
| 9,053,416 B1 | 6/2015 | De Leo et al. | |
| D733,747 S | 7/2015 | Jeong et al. | |
| 9,098,248 B2 | 8/2015 | Suzuki et al. | |
| 9,098,551 B1 | 8/2015 | Fryz et al. | |
| 9,122,989 B1 | 9/2015 | Morris et al. | |
| D751,570 S | 3/2016 | Lee et al. | |
| D751,571 S | 3/2016 | Lee et al. | |
| D751,572 S | 3/2016 | Lee et al. | |
| D752,601 S | 3/2016 | Lam | |
| D752,636 S | 3/2016 | Yoon et al. | |
| 9,317,498 B2 | 4/2016 | Baker et al. | |
| D755,805 S | 5/2016 | Zankowski et al. | |
| D755,806 S | 5/2016 | Zankowski et al. | |
| D755,832 S | 5/2016 | Liu et al. | |
| D757,788 S | 5/2016 | Shrivastava | |
| 9,348,898 B2 | 5/2016 | Nice et al. | |
| 9,396,258 B2 | 7/2016 | Chu et al. | |
| 9,405,741 B1 | 8/2016 | Schaaf et al. | |
| D766,274 S | 9/2016 | Che et al. | |
| 9,471,671 B1 | 10/2016 | Juang et al. | |
| 9,473,803 B2 | 10/2016 | Wang | |
| 9,569,785 B2 | 2/2017 | Alon et al. | |
| 9,582,767 B2 | 2/2017 | Somekh et al. | |
| 9,660,947 B1 | 5/2017 | Hart | |
| 9,703,783 B2 | 7/2017 | Yi et al. | |
| 9,785,883 B2 | 10/2017 | Luvogt et al. | |
| 9,836,533 B1 | 12/2017 | Levi et al. | |
| 9,836,765 B2 | 12/2017 | Hariri et al. | |
| 9,846,836 B2 | 12/2017 | Gao et al. | |
| D806,723 S | 1/2018 | Gussev et al. | |
| 9,900,659 B1 | 2/2018 | Norum et al. | |
| 9,916,613 B1 | 3/2018 | Dorner et al. | |
| 10,003,924 B2 | 6/2018 | Volozh et al. | |
| 10,051,304 B2 * | 8/2018 | Tidwell | H04N 21/25891 |
| D828,369 S | 9/2018 | Arutyunyan et al. | |
| 10,102,559 B1 | 10/2018 | Jain et al. | |
| 10,114,901 B2 | 10/2018 | Mitrovic | |
| 10,149,958 B1 | 12/2018 | Tran et al. | |
| 10,242,259 B2 | 3/2019 | Hagelin | |
| D847,163 S | 4/2019 | Matsumura | |
| 10,909,576 B1 * | 2/2021 | Arivukkarasu | G06Q 30/0269 |
| 11,074,495 B2 | 7/2021 | Zadeh et al. | |
| 2002/0054164 A1 | 5/2002 | Uemura | |
| 2002/0198882 A1 | 12/2002 | Linden et al. | |
| 2004/0158497 A1 | 8/2004 | Brand | |
| 2004/0260621 A1 | 12/2004 | Foster et al. | |
| 2005/0076365 A1 | 4/2005 | Popov et al. | |
| 2005/0086110 A1 * | 4/2005 | Haley | G06Q 30/02 705/14.52 |
| 2005/0097190 A1 | 5/2005 | Abdelhak | |
| 2006/0031114 A1 | 2/2006 | Zommers | |
| 2006/0041548 A1 | 2/2006 | Parsons et al. | |
| 2006/0293065 A1 | 12/2006 | Chew et al. | |
| 2008/0134043 A1 | 6/2008 | Georgis et al. | |
| 2008/0222132 A1 | 9/2008 | Pan et al. | |
| 2008/0243733 A1 | 10/2008 | Black | |
| 2008/0250039 A1 | 10/2008 | Franks et al. | |
| 2008/0256017 A1 | 10/2008 | Murakami | |
| 2008/0266289 A1 | 10/2008 | Park | |
| 2008/0281711 A1 * | 11/2008 | Bridges | G06Q 30/0251 705/14.27 |
| 2008/0294617 A1 | 11/2008 | Chakrabarti et al. | |
| 2009/0006371 A1 | 1/2009 | Denoue | |
| 2009/0006373 A1 | 1/2009 | Chakrabarti et al. | |
| 2009/0006398 A1 | 1/2009 | Lam et al. | |
| 2009/0055385 A1 | 2/2009 | Jeon et al. | |
| 2009/0150935 A1 | 6/2009 | Peters et al. | |
| 2009/0163183 A1 | 6/2009 | O'Donoghue et al. | |
| 2009/0199113 A1 | 8/2009 | McWhinnie et al. | |
| 2009/0249217 A1 | 10/2009 | Narayanaswami | |
| 2009/0276368 A1 | 11/2009 | Martin et al. | |
| 2009/0327941 A1 | 12/2009 | Fong et al. | |
| 2010/0050067 A1 | 2/2010 | Curwen et al. | |
| 2010/0070454 A1 | 3/2010 | Masuda et al. | |
| 2010/0070928 A1 | 3/2010 | Goodger et al. | |
| 2010/0082422 A1 | 4/2010 | Heilig et al. | |
| 2010/0131844 A1 | 5/2010 | Wohlert | |
| 2010/0175018 A1 | 7/2010 | Petschnigg et al. | |
| 2010/0205542 A1 | 8/2010 | Walman | |
| 2010/0241597 A1 | 9/2010 | Chen et al. | |
| 2010/0251304 A1 | 9/2010 | Donoghue et al. | |
| 2010/0312650 A1 | 12/2010 | Pinckney et al. | |
| 2010/0312724 A1 | 12/2010 | Pinckney et al. | |
| 2011/0029636 A1 | 2/2011 | Smyth et al. | |
| 2011/0035388 A1 | 2/2011 | Im et al. | |
| 2011/0047136 A1 | 2/2011 | Dehn | |
| 2011/0047491 A1 | 2/2011 | Hwang et al. | |
| 2011/0066497 A1 | 3/2011 | Gopinath et al. | |
| 2011/0072011 A1 | 3/2011 | Qiao | |
| 2011/0072013 A1 | 3/2011 | Mosoi et al. | |
| 2011/0107223 A1 | 5/2011 | Tilton et al. | |
| 2011/0112981 A1 | 5/2011 | Park et al. | |
| 2011/0125763 A1 | 5/2011 | Takanen et al. | |
| 2011/0179081 A1 | 7/2011 | Ovsjanikov et al. | |
| 2011/0208732 A1 | 8/2011 | Melton et al. | |
| 2011/0213761 A1 | 9/2011 | Song et al. | |
| 2011/0246406 A1 | 10/2011 | Lahav et al. | |

(56) References Cited

U.S. PATENT DOCUMENTS

| | | |
|---|---|---|
| 2011/0252050 A1 | 10/2011 | Palleti et al. |
| 2011/0258185 A1 | 10/2011 | Acharya et al. |
| 2011/0302117 A1 | 12/2011 | Pinckney et al. |
| 2011/0302158 A1 | 12/2011 | Sanders |
| 2011/0320450 A1 | 12/2011 | Liu et al. |
| 2012/0030159 A1 | 2/2012 | Pilaszy et al. |
| 2012/0054794 A1 | 3/2012 | Kim et al. |
| 2012/0059707 A1 | 3/2012 | Goenka et al. |
| 2012/0143871 A1 | 6/2012 | Liebald et al. |
| 2012/0158685 A1 | 6/2012 | White et al. |
| 2012/0159337 A1 | 6/2012 | Travilla et al. |
| 2012/0191776 A1 | 7/2012 | Ruffner et al. |
| 2012/0209907 A1 | 8/2012 | Andrews et al. |
| 2012/0254097 A1 | 10/2012 | Flinn et al. |
| 2012/0278767 A1 | 11/2012 | Stibel et al. |
| 2012/0288153 A1 | 11/2012 | Tojo et al. |
| 2012/0304073 A1 | 11/2012 | Mandic et al. |
| 2012/0317104 A1 | 12/2012 | Radlinski et al. |
| 2012/0323349 A9 | 12/2012 | Khedouri et al. |
| 2013/0009990 A1 | 1/2013 | Hsu et al. |
| 2013/0024471 A1 | 1/2013 | Mitrovic |
| 2013/0031090 A1 | 1/2013 | Posse et al. |
| 2013/0041896 A1 | 2/2013 | Ghani et al. |
| 2013/0046772 A1 | 2/2013 | Gu et al. |
| 2013/0047112 A1 | 2/2013 | Waeller |
| 2013/0073988 A1 | 3/2013 | Groten et al. |
| 2013/0080968 A1 | 3/2013 | Hanson et al. |
| 2013/0085871 A1* | 4/2013 | Goss ............... G06Q 30/02 705/14.73 |
| 2013/0111395 A1 | 5/2013 | Ying et al. |
| 2013/0132515 A1 | 5/2013 | Mostafa et al. |
| 2013/0158693 A1 | 6/2013 | Beckmann et al. |
| 2013/0159243 A1 | 6/2013 | Wei et al. |
| 2013/0179252 A1 | 7/2013 | Dong et al. |
| 2013/0194308 A1 | 8/2013 | Privault et al. |
| 2013/0204737 A1 | 8/2013 | Agarwal et al. |
| 2013/0227054 A1 | 8/2013 | Zhang et al. |
| 2013/0241952 A1* | 9/2013 | Richman ............... G06F 16/972 345/619 |
| 2013/0262478 A1 | 10/2013 | Kemp et al. |
| 2013/0290110 A1 | 10/2013 | Luvogt et al. |
| 2013/0290905 A1 | 10/2013 | Luvogt et al. |
| 2013/0297698 A1 | 11/2013 | Odero et al. |
| 2013/0311408 A1 | 11/2013 | Bagga et al. |
| 2013/0346182 A1 | 12/2013 | Cheng et al. |
| 2013/0346234 A1 | 12/2013 | Hendrick et al. |
| 2013/0346545 A1* | 12/2013 | Petersen ............... G06F 16/955 709/217 |
| 2014/0006399 A1 | 1/2014 | Vasudevan et al. |
| 2014/0025532 A1 | 1/2014 | Huang et al. |
| 2014/0025609 A1 | 1/2014 | Coster et al. |
| 2014/0032678 A1 | 1/2014 | Koukoumidis et al. |
| 2014/0040776 A1 | 2/2014 | Dann et al. |
| 2014/0074856 A1 | 3/2014 | Rao et al. |
| 2014/0095967 A1 | 4/2014 | Cheng et al. |
| 2014/0100835 A1 | 4/2014 | Majumdar et al. |
| 2014/0101142 A1 | 4/2014 | Gomez et al. |
| 2014/0101192 A1 | 4/2014 | Sabah et al. |
| 2014/0122605 A1 | 5/2014 | Merom et al. |
| 2014/0129500 A1 | 5/2014 | Nice et al. |
| 2014/0136528 A1 | 5/2014 | Anima et al. |
| 2014/0137013 A1 | 5/2014 | Matas |
| 2014/0143012 A1 | 5/2014 | Alon et al. |
| 2014/0143738 A1 | 5/2014 | Underwood et al. |
| 2014/0156681 A1 | 6/2014 | Lee et al. |
| 2014/0164365 A1 | 6/2014 | Graham |
| 2014/0172544 A1 | 6/2014 | Rabkin |
| 2014/0172545 A1 | 6/2014 | Rabkin |
| 2014/0181121 A1 | 6/2014 | Nice et al. |
| 2014/0189014 A1 | 7/2014 | Dolan et al. |
| 2014/0195890 A1 | 7/2014 | Taylor et al. |
| 2014/0201675 A1 | 7/2014 | Joo et al. |
| 2014/0207622 A1 | 7/2014 | Vijayaraghavan et al. |
| 2014/0250390 A1 | 9/2014 | Holmes et al. |
| 2014/0278308 A1* | 9/2014 | Liu ............... G06Q 30/0251 703/6 |
| 2014/0278786 A1 | 9/2014 | Liu-Qiu-Yan |
| 2014/0280080 A1 | 9/2014 | Solheim et al. |
| 2014/0280221 A1 | 9/2014 | Chuang et al. |
| 2014/0280565 A1 | 9/2014 | Grewal |
| 2014/0298263 A1 | 10/2014 | Maeda et al. |
| 2014/0316930 A1 | 10/2014 | Jain et al. |
| 2014/0317105 A1 | 10/2014 | Jain et al. |
| 2014/0358916 A1 | 12/2014 | Anand et al. |
| 2014/0359489 A1 | 12/2014 | Zhao et al. |
| 2014/0365853 A1 | 12/2014 | Kleinhout et al. |
| 2014/0365854 A1 | 12/2014 | Karunamuni et al. |
| 2014/0379893 A1 | 12/2014 | Kannan et al. |
| 2014/0380219 A1 | 12/2014 | Cartan |
| 2015/0006286 A1 | 1/2015 | Liu et al. |
| 2015/0039406 A1* | 2/2015 | Dubey ............... G06Q 30/0269 705/14.4 |
| 2015/0052003 A1 | 2/2015 | Tang et al. |
| 2015/0058264 A1 | 2/2015 | Hughes et al. |
| 2015/0066643 A1 | 3/2015 | Choi et al. |
| 2015/0088921 A1 | 3/2015 | Somaiya et al. |
| 2015/0100587 A1 | 4/2015 | Walkingshaw et al. |
| 2015/0112801 A1 | 4/2015 | Nice et al. |
| 2015/0120712 A1 | 4/2015 | Yi et al. |
| 2015/0120722 A1 | 4/2015 | Martin et al. |
| 2015/0154197 A1 | 6/2015 | Lightner et al. |
| 2015/0161256 A1 | 6/2015 | Jeh |
| 2015/0161672 A1 | 6/2015 | Jung et al. |
| 2015/0169557 A1 | 6/2015 | Ciordas et al. |
| 2015/0178282 A1 | 6/2015 | Gorur et al. |
| 2015/0189070 A1 | 7/2015 | Baker |
| 2015/0220835 A1 | 8/2015 | Wilson et al. |
| 2015/0242492 A1 | 8/2015 | Bhatt et al. |
| 2015/0269370 A1 | 9/2015 | Phillips |
| 2015/0269488 A1 | 9/2015 | Galai et al. |
| 2015/0278706 A1 | 10/2015 | Shivashankar et al. |
| 2015/0312348 A1 | 10/2015 | Lustgarten |
| 2015/0325094 A1 | 11/2015 | Cheng et al. |
| 2015/0330805 A1 | 11/2015 | Cho et al. |
| 2015/0331859 A1 | 11/2015 | Raichelgauz et al. |
| 2015/0331951 A1 | 11/2015 | Wang et al. |
| 2015/0347358 A1 | 12/2015 | Shultz et al. |
| 2015/0347920 A1 | 12/2015 | Medlock et al. |
| 2015/0370798 A1 | 12/2015 | Ju et al. |
| 2015/0378707 A1 | 12/2015 | Park et al. |
| 2015/0379146 A1 | 12/2015 | Tonse et al. |
| 2016/0004394 A1 | 1/2016 | Macadaan et al. |
| 2016/0019581 A1 | 1/2016 | Wu et al. |
| 2016/0021179 A1 | 1/2016 | James et al. |
| 2016/0055242 A1 | 2/2016 | Bradic et al. |
| 2016/0063065 A1 | 3/2016 | Khatri et al. |
| 2016/0070803 A1 | 3/2016 | Nuckolls |
| 2016/0110363 A1 | 4/2016 | Tkach et al. |
| 2016/0112760 A1 | 4/2016 | Kosseifi et al. |
| 2016/0117397 A1 | 4/2016 | Bansal et al. |
| 2016/0147753 A1 | 5/2016 | Dimson et al. |
| 2016/0154887 A1 | 6/2016 | Zhao |
| 2016/0170982 A1 | 6/2016 | Djuric et al. |
| 2016/0188739 A1 | 6/2016 | Tang et al. |
| 2016/0196244 A1 | 7/2016 | Greenberg et al. |
| 2016/0210289 A1 | 7/2016 | Esinovskaya et al. |
| 2016/0239871 A1* | 8/2016 | Yu ............... G06Q 30/0264 |
| 2016/0259790 A1* | 9/2016 | Mashiach ......... G06F 16/24578 |
| 2016/0274744 A1 | 9/2016 | Neumann et al. |
| 2016/0275804 A1 | 9/2016 | Koppel et al. |
| 2016/0283481 A1* | 9/2016 | Morley ............... G06F 16/9535 |
| 2016/0299992 A1 | 10/2016 | Cetintas et al. |
| 2016/0328480 A1 | 11/2016 | Owens et al. |
| 2016/0350812 A1 | 12/2016 | Priness et al. |
| 2016/0371274 A1 | 12/2016 | Ng et al. |
| 2017/0011112 A1 | 1/2017 | Jing et al. |
| 2017/0011409 A1 | 1/2017 | Eager et al. |
| 2017/0017369 A1 | 1/2017 | Kanter et al. |
| 2017/0024391 A1 | 1/2017 | Steck |
| 2017/0024657 A1 | 1/2017 | Sahu et al. |
| 2017/0053646 A1 | 2/2017 | Watanabe et al. |
| 2017/0060870 A1 | 3/2017 | Checkley |
| 2017/0060872 A1 | 3/2017 | Sacheti et al. |

(56) References Cited

U.S. PATENT DOCUMENTS

| | | | |
|---|---|---|---|
| 2017/0061014 A1 | 3/2017 | Heiler et al. | |
| 2017/0061286 A1 | 3/2017 | Kumar et al. | |
| 2017/0068992 A1 | 3/2017 | Chen et al. | |
| 2017/0076318 A1 | 3/2017 | Goswami et al. | |
| 2017/0083965 A1 | 3/2017 | Sun | |
| 2017/0091194 A1 | 3/2017 | Spiegel | |
| 2017/0103343 A1 | 4/2017 | Yee et al. | |
| 2017/0124093 A1 | 5/2017 | Carbonell et al. | |
| 2017/0132230 A1 | 5/2017 | Muralidhar et al. | |
| 2017/0161773 A1* | 6/2017 | Xu | G06N 20/00 |
| 2017/0293865 A1 | 10/2017 | Sandler | |
| 2017/0337612 A1 | 11/2017 | Galron et al. | |
| 2018/0011937 A1 | 1/2018 | Tikhonov | |
| 2018/0012236 A1 | 1/2018 | Zhuo et al. | |
| 2018/0014038 A1 | 1/2018 | Lamburt et al. | |
| 2018/0020258 A1 | 1/2018 | Jeon et al. | |
| 2018/0049001 A1 | 2/2018 | Volozh et al. | |
| 2018/0075137 A1 | 3/2018 | Lifar | |
| 2018/0096388 A1 | 4/2018 | Lu | |
| 2018/0204111 A1 | 7/2018 | Zadeh et al. | |
| 2018/0336183 A1 | 11/2018 | Lee et al. | |
| 2018/0365562 A1 | 12/2018 | Volkova | |
| 2019/0034432 A1* | 1/2019 | Rybalchenko | G06F 16/9535 |
| 2019/0060602 A1 | 2/2019 | Tran et al. | |
| 2019/0069030 A1 | 2/2019 | Jackman et al. | |
| 2019/0130296 A1* | 5/2019 | Basu | G06F 9/451 |
| 2019/0236448 A1 | 8/2019 | Piatt | |
| 2019/0342616 A1 | 11/2019 | Domm et al. | |
| 2020/0007936 A1* | 1/2020 | Salomatin | G06Q 30/0282 |
| 2020/0090247 A1 | 3/2020 | Sokolov et al. | |
| 2020/0184278 A1 | 6/2020 | Zadeh et al. | |
| 2020/0202073 A1 | 6/2020 | Ghulati | |

FOREIGN PATENT DOCUMENTS

| | | |
|---|---|---|
| CN | 103473354 A | 12/2013 |
| CN | 103559262 A | 2/2014 |
| CN | 103678672 A | 3/2014 |
| CN | 103838842 A | 6/2014 |
| CN | 103942288 A | 7/2014 |
| CN | 104102696 A | 10/2014 |
| CN | 104317835 A | 1/2015 |
| CN | 104503973 A | 4/2015 |
| CN | 104636371 A | 5/2015 |
| CN | 303532062 S | 12/2015 |
| CN | 105893398 A | 8/2016 |
| CN | 103559262 B | 10/2016 |
| CN | 106446195 A | 2/2017 |
| CN | 106777229 A | 5/2017 |
| CN | 106802915 A | 6/2017 |
| CN | 106815297 A | 6/2017 |
| CN | 106874374 A | 6/2017 |
| CN | 107491813 A | 12/2017 |
| CN | 107577682 A | 1/2018 |
| CN | 104903889 B | 5/2018 |
| CN | 108346072 A | 7/2018 |
| EP | 3032780 A | 6/2016 |
| JP | 2009015834 A | 1/2009 |
| JP | 2015079395 A | 4/2015 |
| KR | 20160064447 A | 6/2016 |
| RU | 2368006 C1 | 9/2009 |
| RU | 2417419 C2 | 4/2011 |
| RU | 2417437 C2 | 4/2011 |
| RU | 2419858 C2 | 5/2011 |
| RU | 2451986 C2 | 11/2011 |
| RU | 2481748 C2 | 5/2013 |
| RU | 2509341 C2 | 3/2014 |
| RU | 2523930 C2 | 7/2014 |
| RU | 2013101601 A | 7/2014 |
| RU | 2543315 C2 | 2/2015 |
| RU | 2577193 C2 | 3/2016 |
| RU | 2580516 C2 | 4/2016 |
| RU | 2605039 C2 | 12/2016 |
| RU | 2629449 C2 | 8/2017 |
| RU | 2632100 C2 | 10/2017 |
| RU | 2632132 C2 | 10/2017 |
| RU | 2632138 C2 | 10/2017 |
| RU | 2660602 C1 | 7/2018 |
| RU | 2017101241 A | 7/2018 |
| RU | 2663478 C2 | 8/2018 |
| WO | 2002052374 A2 | 7/2002 |
| WO | 2009087414 A1 | 7/2009 |
| WO | 2013010698 A1 | 1/2013 |
| WO | 2013189738 A1 | 12/2013 |
| WO | 2014141078 A1 | 9/2014 |
| WO | 2016030702 A1 | 3/2016 |
| WO | 2019043381 A1 | 3/2019 |

OTHER PUBLICATIONS

"Identify, Match, and Target—Penton's Audience-Based Targeting Reaches the Right Individual, Audience, or Company to Accelerate Marketing Programs," PR Newswire, PR Newswire Associated LLC, Aug. 11, 2016 (Year: 2016).*

"Browser Amigo by Mail.ru", https://www.youtube.com/watch?v=9IPOwpplcWM accessed on Mar. 9, 2020; https://www.youtube.com/watch?v=vdxnXZT2tQo accessed on Mar. 9, 2020, pdf 7 pages.

Search Report with regard to the counterpart RU Patent Application No. 2018132708 completed Feb. 18, 2020.

Search Report with regard to the counterpart RU Patent Application No. 2018132713 completed Feb. 21, 2020.

English Abstract for RU2017101241 retrieved on Espacenet on Mar. 12, 2020.

English Abstract for CN107577682 retrieved on Espacenet on Mar. 12, 2020.

English Abstract for CN 108346072 retrieved on Espacenet on Mar. 12, 2020.

Office Action with regard to the counterpart U.S. Appl. No. 15/263,493 dated May 9, 2019.

Martin Beck, "Facebook Now Asks Why You're Hiding That Ad, To Better Target Them & Block Offensive Ones" (Sep. 11, 2014), Marketing Land, Social Media Marketing, Retrieved May 4, 2019, PDF Attached, https://marketingland.com/facebook-adjusts-news-feed-mix-suppress-ads-users-hide-99727 (Year: 2014).

Search Report with regard to the counterpart RU Patent Application No. 2018135362 completed Mar. 26, 2020.

English Abstract for CN104903889 retrieved on Espacenet on Apr. 16, 2020.

Search Report with regard to the counterpart RU Patent Application No. 2018135455 completed May 22, 2020.

Notice of Allowance received with regard to the counterpart U.S. Appl. No. 29/590,781 dated Dec. 20, 2019.

Search Report with regard to the counterpat RU Patent Application No. 2018132716 completed Nov. 25, 2019.

English Abstract for CN 104317835 retrieved on Espacenet on May 7, 2018.

English Abstract for CN105893398 retrieved on Espacenet on May 7, 2018.

English Abstract for CN106446195 retrieved on Espacenet on May 7, 2018.

English Abstract for KR20160064447 retrieved on Espacenet on May 7, 2018.

English Abstract for CN104102696 retrieved on Espacenet on May 8, 2018.

English Abstract for JP2015079395 retrieved on Espacenet on May 8, 2018.

English Abstract for CN106777229 retrieved on Espacenet on May 8, 2018.

English Abstract for CN103942288 retrieved on Espacenet on May 8, 2018.

English Abstract for CN103559262 retrieved on Espacenet on May 8, 2018.

English Abstract for CN106815297 retrieved on Espacenet on May 8, 2018.

English Abstract for CN106802915 retrieved on Espacenet on May 8, 2018.

(56) References Cited

OTHER PUBLICATIONS

English Abstract for CN107491813 retrieved on Espacenet on May 8, 2018.
English Abstract for CN104503973 retrieved on Espacenet on May 8, 2018.
English Abstract for CN106874374 retrieved on Espacenet on May 8, 2018.
English Abstract for CN104636371 retrieved on Espacenet on May 8, 2018.
Beemanapalli et al., "Incorporating Usage Information into Average-Clicks Algorithm", Lecture Notes in Computer Science, vol. 4811, 2007, pp. 21-35, https://link.springer.com/chapter/10.1007%2F978-3-540-77485-3_2.
English Abstract for CN103167330 retrieved on Espacenet on May 9, 2018.
English Abstract for CN103473354 retrieved on Espacenet on Jan. 4, 2019.
English Abstract for JP2009015834 retrieved on Espacenet on Mar. 21, 2019.
Notice of Allowance with regard to the counterpart U.S. Appl. No. 15/262,332 dated Mar. 18, 2019.
Office Action with regard to the counterpart U.S. Appl. No. 15/592,745 dated Mar. 8, 2019.
Office Action with regard to the counterpart U.S. Appl. No. 15/262,318 dated Apr. 1, 2019.
U.S. Appl. No. 16/370,286, filed Mar. 29, 2019.
Notice of Allowance received with regard to the counterpart U.S. Appl. No. 15/606,658 dated Jun. 26, 2019.
English abstract of CN 103838842 retrieved from Espacenet on Feb. 3, 2017.
Brunner, Don't panic: Mozilla will be incorporating ads into Firefox, http://www.extremetech.com/internet/176521-dont-panic-mozilla-will-be-incorporating-ads-into-firefox, Feb. 12, 2014, retrieved on Nov. 11, 2016.
Mozilla / newnewtab, https://github.com/mozilla/newnewtab, retrieved on Nov. 11, 2016, 2 pages.
Brinkmann, Mozilla adds Suggested Sites feature to New Tab Page, May 15, 2015, http://www.ghacks.net/2015/05/15/mozilla-adds-suggested-sites-feature-to-new-tab-page/, retrieved on Nov. 11, 2016, 14 pages.
Lee, Mozilla Labs, New Tab Site Suggestions, https://blog.mozilla.org/labs/2012/11/new-tab-site-suggestions/, Nov. 2, 2012, retrieved on Nov. 11, 2016, 5 pages.
Opera Help, Speed Dial, http://help.opera.com/Windows/12.10/en/speeddial.html, retrieved on Nov. 11, 2016, 2 pages.
Sams, Windows 10 build 10120: Microsoft introduces a 'new tab' page for Edge, https://www.neowin.net/news/windows-10-build-10120-microsoft-introduces-a-039new-tab039-page-for-edge, May 18, 2015, retrieved on Nov. 11, 2016, 4 pages.
Russian Search Report from RU patent application No. 2015141291 dated Nov. 2, 2016.
Extended European Search Report from EP16190997, dated Feb. 16, 2017, Herry, Tzvetanka.
European Search report from EP 16185747, Siodmok, Wojciech, dated Jan. 18, 2017.
English abstract of CN103678672 retrieved from Espacenet on Jan. 20, 2017.
English abstract of CN103077220 retrieved from Espacenet on Jan. 20, 2017.
Russian Search Report dated Nov. 9, 2016 from Russian Patent Application No. 2015136684.
Amatriain et al., System Architectures for Personalization and Recommendation, http://techblog.netflix.com/2013/03/system-architectures-for.html, retrieved on May 30, 2015.
English Abstract of CN303532062 retrieved on Google Translate on Apr. 4, 2017.
Kumar et al., "Knowledge Retrieval from Web Server Logs Using Web Usage Mining", International Journal of Science and Research (IJSR), 2015, vol. 4, Issue 3, pp. 2173-2176.

Kim et al., "Ranking Web Documents with Dynamic Evaluation by Expert Groups", J. Eder and M. Missikoff (Eds.), CAISE, 2003, pp. 437-448.
Russian Search Report from RU patent application No. 2016127447 dated Feb. 7, 2017.
Pilaszy et al., "Fast ALS-based Matrix Factorization for Explicit and Implicit Feedback Datasets", RECSYS'10, 2010, pp. 71-78.
U.S. Appl. No. 15/236,538, filed Aug. 15, 2016.
U.S. Appl. No. 15/263,493, filed Sep. 13, 2016.
U.S. Appl. No. 15/262,318, filed Sep. 12, 2016.
U.S. Appl. No. 15/262,332, filed Sep. 12, 2016.
Design U.S. Appl. No. 29/590,781, filed Jan. 13, 2017.
U.S. Appl. No. 15/592,745, filed May 11, 2017.
U.S. Appl. No. 15/606,326, filed May 26, 2017.
U.S. Appl. No. 15/606,658, filed May 26, 2017.
U.S. Appl. No. 15/607,555, filed May 29, 2017.
Russian Search Report from RU patent application No. 2015141108 dated Sep. 7, 2016.
European Search Report dated Dec. 11, 2017 with regard to the counterpart patent application EP 17 18 9557.
Xiao et al., "Research and Implementation of Hybrid Recommendation Algorithm Based on Collaborative Filtering and Word2Vec", 8th International Symposium on Computational Intelligence and Design, 2015, pp. 172-175.
Koren et al., "Matrix Factorization Techniques for Recommender Systems", IEEE Computer Society, Computer, vol. 42, No. 8, 2009, pp. 42-49.
European Search Report dated Sep. 14, 2017 with regard to the counterpart patent application EP 17 18 0212.
European Search Report dated Sep. 18, 2017 with regard to the counterpart patent application EP 17 18 0214.
RU Search Report (completion date: May 25, 2017) with regard to the counterpart patent application RU 2016127446.
English Abstract for RU2013101601 retrieved on Espacenet on Nov. 2, 2017.
YouTube Account: RnStore, "Zmags Demo", (May 19, 2011 ), times stamp 1:54/3:56, 2:20/3:56, PDF Attached, URL: https://www.youtube.com/watch?v=AsBrLdoEJgA, received from USPTO on May 11, 2018 with regard to the U.S. Appl. No. 15/263,493.
YouTube Account: iappletech128, "Close Tabs in Safari by Swiping", (Oct. 20, 2013), time stamp 0:20-0:35/1 :18, PDF Attached, URL: https://www.youtube.com/watch?v=V8TTbYrFSmg, received from USPTO on May 11, 2018 with regard to the U.S. Appl. No. 15/263,493.
YouTube Account: macmostvideo, "Viewing Photos With the Finder (MacMost Now 612)", (Sep. 30, 2011 ), time stamp 2:05-2:25, PDF Attached, URL: https://www.youtube.com/watch?v=tYoJI6G7Hkg, received from USPTO on May 11, 2018 with regard to the U.S. Appl. No. 15/263,493.
European Examination Report with regard to the counterpart patent application No. EP 16190999.9 dated Jun. 29, 2018.
U.S. Appl. No. 16/010,152, filed Jun. 15, 2018.
Notice of Allowance with regard to the counterpart U.S. Appl. No. 15/592,745 dated Oct. 11, 2018.
Disclosed Anonymously, "System, Method and Computer Program Product for Generating a Relationship-Based Recommendation", Apr. 28, 2006, 21 pages (in the Notice of Allowance with regard to the counterpart U.S. Appl. No. 15/592,745 dated Oct. 11, 2018).
Jim Bainbridge et al., "IBM DB2 Web Query for I Tutorials", Apr. 13, 2017, 570 pages (in the Notice of Allowance with regard to the counterpart U.S. Appl. No. 15/592,745 dated Oct. 11, 2018).
U.S. Appl. No. 16/009,929, filed Jun. 15, 2018.
Office Action with regard to the counterpart U.S. Appl. No. 16/010,152 dated Apr. 7, 2020.
Office Action with regard to the counterpart U.S. Appl. No. 16/503,560 dated Apr. 15, 2021.
Office Action with regard to the counterpart U.S. Appl. No. 15/607,555 dated Apr. 19, 2021.
Office Action with regard to the counterpart U.S. Appl. No. 15/607,555 dated Jun. 11, 2021.
Notice of Allowance with regard to the U.S. Appl. No. 16/503,560 dated Jun. 8, 2021.

(56) References Cited

OTHER PUBLICATIONS

Levy et al., "Neural Ward Embedding as Implicit Matrix Factorization", Advances in Neural Information Processing, 2014, p. 2177-2185 (Year: 2014)—cited in the Office Action with regard to the counterpart U.S. Appl. No. 15/607,555 dated Jun. 11, 2021.
Search Report with regard to the counterpart RU Patent Application 2017140972 completed May 13, 2019.
Office Action with regard to the counterpart U.S. Appl. No. 16/010,152 dated Apr. 2, 2021.
Office Action with regard to the counterpart U.S. Appl. No. 16/009,929 dated Mar. 16, 2021.
Office Action with regard to the counterpart U.S. Appl. No. 15/607,555 dated Aug. 17, 2021.
Office Action with regard to the counterpart U.S. Appl. No. 16/372,553 dated Jul. 29, 2021.
Office Action with regard to the counterpart U.S. Appl. No. 16/009,929 dated Aug. 2, 2021.
Menczer, "Fake Online News Spreads Through Social Echo Chambers", The Conversation, Computing, ScientificAmerican.com, Nov. 28, 2016, pp. 1-10.
Office Action with regard to the U.S. Appl. No. 16/009,929 dated Dec. 3, 2021.
Jamali, Mohsen et al., "TrustWalker: A Random Walk Madel for Combining Trust-based and Item-based Recommendation." KDD'09, Jun. 28-Jul. 1, 2009, Paris, France. (Year: 2009).
Office Action with regard to the U.S. Appl. No. 16/503,546 dated Oct. 4, 2021.
Office Action with regard to the U.S. Appl. No. 15/607,555 dated Dec. 9, 2021.
Office Action with regard to the U.S. Appl. No. 16/934,288 dated Nov. 12, 2021.
Notice of Allowance with regard to the counterpart U.S. Appl. No. 16/370,286 dated Mar. 31, 2020.

\* cited by examiner

METHOD AND SYSTEM FOR GENERATING A DIGITAL CONTENT RECOMMENDATION

CROSS-REFERENCE

The present application claims priority to Russian Patent Application No. 2018132708, entitled "Method and System for Generating a Digital Content Recommendation," filed on Sep. 14, 2018, the entirety of which is incorporated herein by reference.

FIELD

The present technology relates to recommendation systems in general and specifically to a method and a system for generating a digital content recommendation.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment-related information. Users use a variety of client devices (desktop, laptop, notebook, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows a priori that she/he wants to search. In other words, if the user is interested in obtaining information about the most popular destinations in Italy (i.e. a known search topic), the user could submit a search query: "The most popular destinations in Spain?" The search engine will then present a ranked list of Internet resources that are potentially relevant to the search query. The user can then browse the ranked list of search results in order to obtain information she/he is interested in as it related to places to visit in Spain. If the user, for whatever reason, is not satisfied with the uncovered search results, the user can re-run the search, for example, with a more focused search query, such as "The most popular destinations in Spain in the summer?", "The most popular destinations in the South of Spain?", "The most popular destinations for a culinary getaway in Spain?".

There is another approach that has been proposed for allowing the user to discover content and, more precisely, to allow for discovering and/or recommending content that the user may not be expressly interested in searching for. In a sense, such systems recommend content to the user without an express search request based on explicit or implicit interests of the user.

An example of such a system is a FLIPBOARD™ recommendation system, which system aggregates and recommends content from various social networks. The FLIPBOARD recommendation system presents the uncovered content in a "magazine style" format, where the user can "flip" through the pages with the recommended/aggregated content. The recommendation system collects content from social media and other websites, presents it in magazine format, and allows users to "flip" through their social-networking feeds and feeds from websites that have partnered with the company, effectively "recommending" content to the user even though the user may not have expressly expressed her/his desire in the particular content.

Another example of the recommendation system is YANDEX.ZEN™ recommendation system. The Yandex.Zen recommendation system recommends digital content (such as articles, news, and video in a personalized feed on the Yandex.Browser start screen). As the user browses the Yandex.Zen recommended content, the server acquires explicit (by asking whether the user likes to see more of such content in the user's feed) or implicit (by observing user content interactions) feedback. Using the user feedback, the Yandex.Zen server continuously improves the content recommendations presented to the given user.

Recommendation systems provide personalized content to users based on previous user interactions with the recommendation service that can be indicative of user preferences for some particular content rather than other content. Typically, the recommended content comes from two principal sources—a native source and an external source.

The external sources are web sites on the Internet, such as news agencies, news aggregators and other source of content items, which can be presented to the users of the recommendation systems. On the other hand, the native sources are "bloggers" that post content using the recommendation system as a platform.

United States Patent Application Publication No. US2016350812A1 published on Dec. 1, 2016, to Microsoft Technology Licensing LLC and titled "Personalized Information From Venue of Interest" teaches providing user with personalized information from venues of interests. The information may comprise messages, notifications, or other information determined to be relevant to the user, and may be timely provided to the user in an appropriate format such that the user is better able to respond to the information. A set of venues that are relevant to the user and corresponding information sources associated with the venue are determined. Information published by these sources may be analyzed for relevance to the user, and the relevant information items may be provided to the user via notifications or applications and services. Further, the notifications may be scheduled for presentation to the user at appropriate times, such as prior to a predicted visit of the venue. One embodiment includes a venue-information clearinghouse for receiving information from venues and making it available for user applications or services.

U.S. Pat. No. 8,606,792B granted on Dec. 10, 2013, to Google LLC and titled "Scoring Authors of Posts" teaches methods, systems, and program products where a score for each of a plurality of authors of posts submitted to a server system is determined. The score for each individual author in the plurality is based on a score of one or more authors in the plurality that have requested to subscribe to a stream of posts that the individual author submits to the server system. A particular post submitted by a particular author in the plurality is received at the server system and from a computing device. A score is assigned to the particular post based on a score of the particular author. The particular post is transmitted from the server system to computing devices that are associated with authors who have requested to subscribe to posts by the particular author.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

As has been alluded to above, the recommended content provided by the recommendation system may originate from two sources—the native source and the external source. Developers of the present technology have appreciated that it may be desirable, as part of providing the publication platform for the publishers of content, the recommendation system may commit to display a certain number of times the content originating from each individual native source.

Without wishing to be bound to any specific theory, the present disclosure is based upon developers' appreciation that the prior art scheme of providing personalized content to a user may not be able to properly balance the need for displaying personalized content that is relevant to the users, and the need for displaying a certain number of times, the content originating from the native source (which may be less relevant to the user) without negatively affecting user satisfaction. It is thus important to achieve an optimal interplay between those two factors to maximize the quality of the recommendation system.

In accordance with a first broad aspect of the present technology, there is provided a method for generating a digital content recommendation, the digital content recommendation to be displayed on an electronic device associated with a user. The method is executed in a recommendation system connectable to the electronic device via a communication network, the recommendation system including a server. The method comprising: receiving, from the electronic device, via the communication network, a request for the digital content recommendation; selecting a set of candidate content items responsive to the request, the set of candidate content items including at least a first content item originating from a first content channel and a second content item originating from a second content channel, each of the first content item and the second content item being associated with a respective: display feature, the display feature being indicative of a number of displays of one or more content items originating from the respective first content channel and second content channel required by the recommendation system within a predetermined time period; and one or more content item features, the one or more content item features being indicative of a characteristic associated with the first content item and the second content item respectively; determining, for each of the first content item and the second content item, a relevancy parameter, the relevancy parameter being based, at least in part, on the one or more content item features associated with the first content item and the second content item respectively; determining, for each of the first content item and the second content item, a completion parameter, the completion parameter being based, at least in part on the respective display feature, the completion parameter representing a degree of each of the first content channel and the second content channel meeting its respective number of displays; ranking, by a ranking algorithm, the first content item and the second content item, based at least on their respective relevancy parameter and the completion parameter; generating the digital content recommendation, the digital content recommendation including at least one of the first content item and the second content item that has been ranked by the ranking algorithm; and transmitting, by the server, the digital content recommendation to the electronic device for display.

In some embodiments of the method, the number of displays is a minimum display value, the minimum display value corresponding to a minimum number of display of one or more content items originating from the respective first content channel and second content channel required by the recommendation system within the predetermined time period.

In some embodiments of the method, determining the completion parameter comprises analyzing one of: an up-to-date displayed value, the up-to-date displayed value corresponding to a number of the one or more content items originating from the respective first content channel and second content channel previously displayed within the predetermined period of time by a plurality of electronic devices; and a predictive completion parameter, the predictive completion parameter being indicative of a predicted number of displays of content items of each of the first content channel and the second content channel within the predetermined time period, the predictive completion parameter being based at least on the up-to-date displayed value.

In some embodiments of the method, the completion parameter is one of: an absolute number of display required to achieve the minimum display value; and a percentage value representative of a rate of achieving the minimum display value.

In some embodiments of the method, ranking the first content item and the second content item comprises: determining a first ranking score associated with the first content item, the first ranking score being determined based on the relevancy parameter associated with the first content item and the completion parameter of the first content item; determining a second ranking score associated with the second content item, the second score being determined based on the relevancy parameter associated with the second content item and the completion parameter of the second content item; and ranking the first content item and the second content item based on the first ranking score and the second ranking score.

In some embodiments of the method, the method further comprising determining a user interest profile of the user associated with the electronic device prior to determining the relevancy parameter.

In some embodiments of the method, the user interest profile is generated based on a set of features, the set of features comprising at least one of: a browsing history associated with the user; a search history associated with the user; user-specific preferences; location of the electronic device; and determining the relevancy parameter comprises applying a machine learning algorithm configured to determine the relevancy parameter of the first content item and the second content item based at least in part of the one or more content item features associated with the first content item and the second content item and the user interest profile.

In some embodiments of the method, the one or more content item features for a given content item comprises: a number of users having previously accessed the content channel associated with the given content item; a number of clicks of the one or more content items originating from the content channel for each of the users; and determining the relevancy parameter comprises: creating a histogram, the histogram representing a plurality of subsets each representing a subset of the number of users, each of the subsets having the number of content items clicked associated with the subset of the number of users; and applying the machine learning algorithm configured to predict the subset in which the user is associated with based on an analysis of the user interest profile of the user and the one or more user interest profile associated with the one or more users.

In some embodiments of the method, the first content item is a first native content item native to the recommendation system, the first native content item originating from the first content channel that is native to the recommendation system; the second content item is a second native content item, the second native content item originating from the second content channel that is native to the recommendation system; the set of candidate content items further comprising one or more non-native content items that are non-native to the recommendation system, the one or more non-native content items being associated with one or more content item features; and the method further comprising determining for each of the one or more non-native content items, the respective relevancy parameter based on the one or more content item features.

In some embodiments of the method, the ranking algorithm is a first ranking algorithm; and the generating the digital content recommendation comprises: ranking by a second ranking algorithm, the one or more non-native content items based at least on their respective relevancy parameter; mixing, by a blending algorithm, the one or more non-native content items with the first native content item and the second native content item, the blending algorithm being configured to mutually rank the first native content item, the second native content item and the one or more non-native content items; and selecting a subset of candidate content items by applying a predefined inclusion parameter indicative of an acceptable number of content items to be included within the digital content recommendation.

In some embodiments of the method, the first content item and the second content item is at least one of: and image; a text; and a video.

In accordance with another broad aspect of the present technology, there is provided a system for generating a digital content recommendation to be displayed on an electronic device associated with a user. The system comprising a server connected to the electronic device via a communication network. The server comprising a processor configured to: receive, from the electronic device, via the communication network, a request for the digital content recommendation; select a set of candidate content items responsive to the request, the set of candidate content items including at least a first content item originating from a first content channel and a second content item originating from a second content channel, each of the first content item and the second content item being associated with a respective: display feature, the display feature being indicative of a number of displays of one or more content items originating from the respective first content channel and second content channel required by the recommendation system within a predetermined time period; one or more content item features, the one or more content item features being indicative of a characteristic associated with the first content item and the second content item respectively; determine, for each of the first content item and the second content item, a relevancy parameter, the relevancy parameter being based, at least in part, on the one or more content item features associated with the first content item and the second content item respectively; determine, for each of the first content item and the second content item, a completion parameter, the completion parameter being based, at least in part on the respective display feature, the completion parameter representing a degree of each of the first content channel and the second content channel meeting its respective number of displays; rank, by a ranking algorithm, the first content item and the second content item, based at least on their respective relevancy parameter and the completion parameter; generate the digital content recommendation, the digital content recommendation including at least one of the first content item and the second content item that has been ranked by the ranking algorithm; and transmit, by the server, the digital content recommendation to the electronic device for display.

In some embodiments of the system, the number of displays is a minimum display value, the minimum display value corresponding to a minimum number of display of one or more content items originating from the respective first content channel and second content channel required by the recommendation system within the predetermined time period.

In some embodiments of the system, to determine the completion parameter, the processor is configured to analyze one of: an up-to-date displayed value, the up-to-date displayed value corresponding to a number of the one or more content items originating from the respective first content channel and second content channel previously displayed within the predetermined period of time by a plurality of electronic devices; a predictive completion parameter, the predictive completion parameter being indicative of a predicted number of displays of content items of each of the first content channel and the second content channel within the predetermined time period, the predictive completion parameter being based at least on the up-to-date displayed value.

In some embodiments of the system, the completion parameter is one of: an absolute number of display required to achieve the minimum display value; and a percentage value representative of a rate of achieving the minimum display value.

In some embodiments of the system, to rank the first content item and the second content item, the processor is configured to: determine a first ranking score associated with the first content item, the first ranking score being determined based on the relevancy parameter associated with the first content item and the completion parameter of the first content item; determine a second ranking score associated with the second content item, the second score being determined based on the relevancy parameter associated with the second content item and the completion parameter of the second content item; rank the first content item and the second content item based on the first ranking score and the second ranking score.

In some embodiments of the system, the processor is further configured to determine a user interest profile of the user associated with the electronic device prior to determining the relevancy parameter.

In some embodiments of the system, the user interest profile is generated based on a set of features, the set of features comprising at least one of: a browsing history associated with the user; a search history associated with the user; user-specific preferences; location of the electronic device; and the processor is configured to determine the relevancy parameter applying a machine learning algorithm configured to determine the relevancy parameter of the first content item and the second content item based at least in part of the one or more content item features associated with the first content item and the second content item and the user interest profile.

In some embodiments of the system, the one or more content item features for a given content item comprises: a number of users having previously accessed the content channel associated with the given content item; a number of clicks of the one or more content items originating from the content channel for each of the users; and to determine the relevancy parameter, the processor is configured to: create a histogram, the histogram representing a plurality of subsets each representing a subset of the number of users, each of the subsets having the number of content items clicked associated with the subset of the number of users; and apply the machine learning algorithm configured to predict the subset in which the user is associated with based on an analysis of the user interest profile of the user and the one or more user interest profile associated with the one or more users.

In some embodiments of the system, the first content item is a first native content item native to the recommendation system, the first native content item originating from the first content channel that is native to the recommendation system; the second content item is a second native content item, the second native content item originating from the second content channel that is native to the recommendation system; the set of candidate content items further comprising one or more non-native content items that are non-native to the recommendation system, the one or more non-native content items being associated with one or more content item features; the processor being further configured to: determine for each of the one or more non-native content items, the respective relevancy parameter based on the one or more content item features.

In some embodiments of the system, the ranking algorithm is a first ranking algorithm: and to generate the digital content recommendation, the processor is configured to: rank by a second ranking algorithm, the one or more non-native content items based at least on their respective relevancy parameter; mix, by a blending algorithm, the one or more non-native content items with the first native content item and the second native content item, the blending algorithm being configured to mutually rank the first native content item, the second native content item and the one or more non-native content items; and select a subset of candidate content items by applying a predefined inclusion parameter indicative of an acceptable number of content items to be included within the digital content recommendation.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
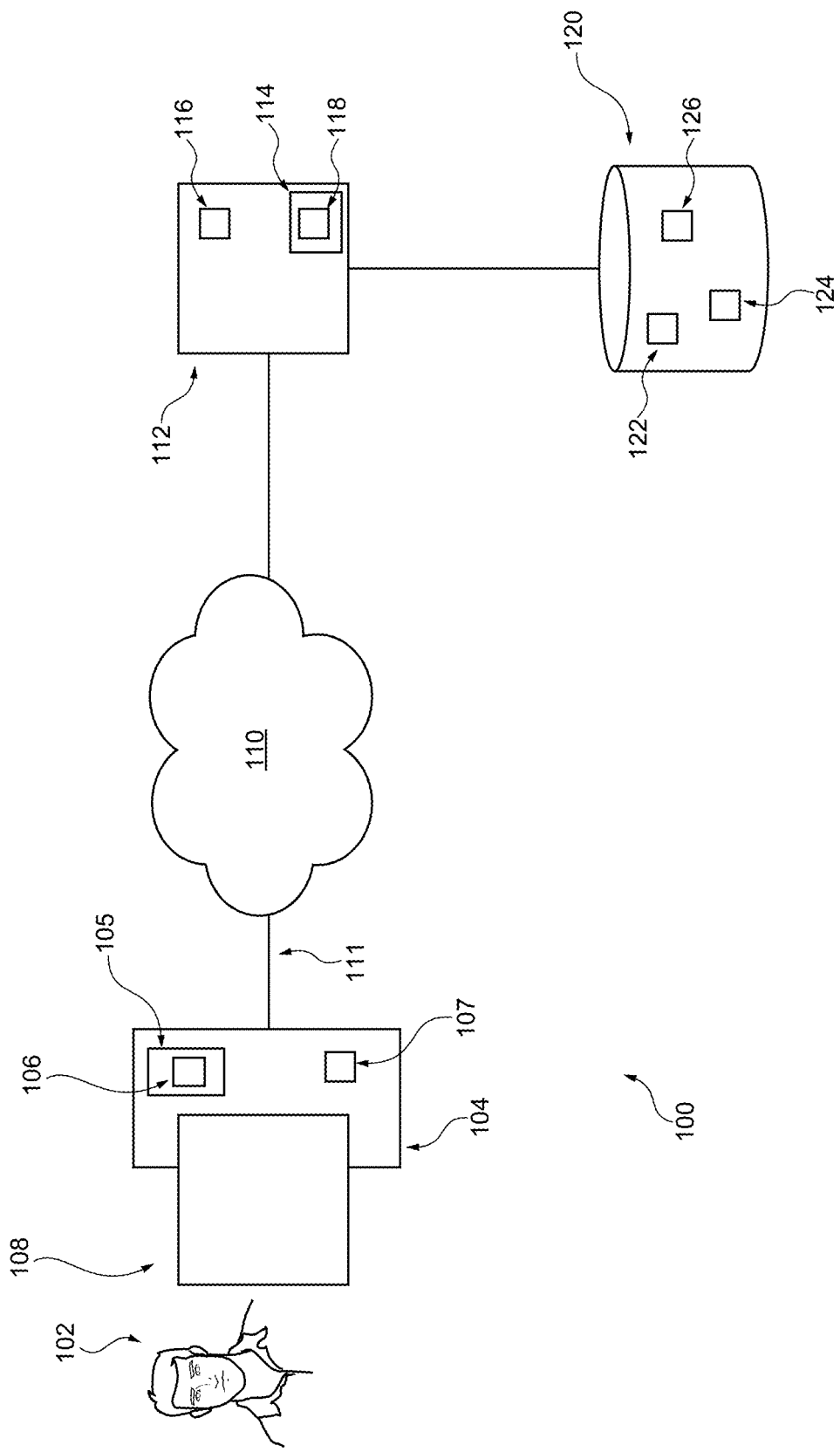
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide content recommendations to a user 102 of the system 100. The user 102 may be a subscriber to a recommendation service provided by the system 100. However, the subscription does not need to be explicit or paid for. For example, the user 102 can become a subscriber by virtue of downloading a recommendation application from the system 100, by registering and provisioning a login/password combination, by registering and provisioning user preferences and the like. As such, any system variation configured to generate content recommendations for the given user can be adapted to execute embodiments of the present technology, once teachings presented herein are appreciated. Furthermore, the system 100 will be described using an example of the system 100 being a recommendation system (therefore, the system 100 can be referred to herein below as a "recommendation system 100"). However, embodiments of the present technology can be equally applied to other types of the system 100, as will be described in greater detail herein below.

The system 100 comprises an electronic device 104, the electronic device 104 being associated with the user 102. As such, the electronic device 104 can sometimes be referred to as a "client device", "end user device" or "client electronic device". It should be noted that the fact that the electronic device 104 is associated with the user 102 does not need to suggest or imply any mode of operation—such as a need to log in, a need to be registered, or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 104 comprises a permanent storage 105. The permanent storage 105 may encompass one or more storage media and generally provides a place to store computer-executable instructions executable by a processor 107. By way of an example, the permanent storage 105 may be implemented as a computer-readable storage medium including Read-Only Memory (ROM), hard disk drives (HDDs), solid-state drives (SSDs), and flash-memory cards.

The electronic device 104 comprises hardware and/or software and/or firmware (or a combination thereof), as is known in the art, to execute a recommendation application 106. Generally speaking, the purpose of the recommendation application 106 is to enable the user to receive (or otherwise access) content recommendations provided by the system 100, as will be described in greater detail herein below.

How the recommendation application 106 is implemented is not particularly limited. One example of the recommendation application 106 may include a user accessing a web site associated with a recommendation service to access the recommendation application 106. For example, the recommendation application 106 can be accessed by typing in (or otherwise copy-pasting or selecting a link) an URL associated with the recommendation service. Alternatively, the recommendation application 106 can be an app downloaded from a so-called app store, such as APPSTORE™ or GOOGLEPLAY™ and installed/executed on the electronic device 104. It should be expressly understood that the recommendation application 106 can be accessed using any other suitable means. In yet additional embodiments, the recommendation application 106 functionality can be incorporated into another application, such as a browser application (not depicted) or the like. For example, the recommendation application 106 can be executed as part of the browser application, and when the user 102 starts the browser application, the recommendation application 106 can be executed.

Figure 2:
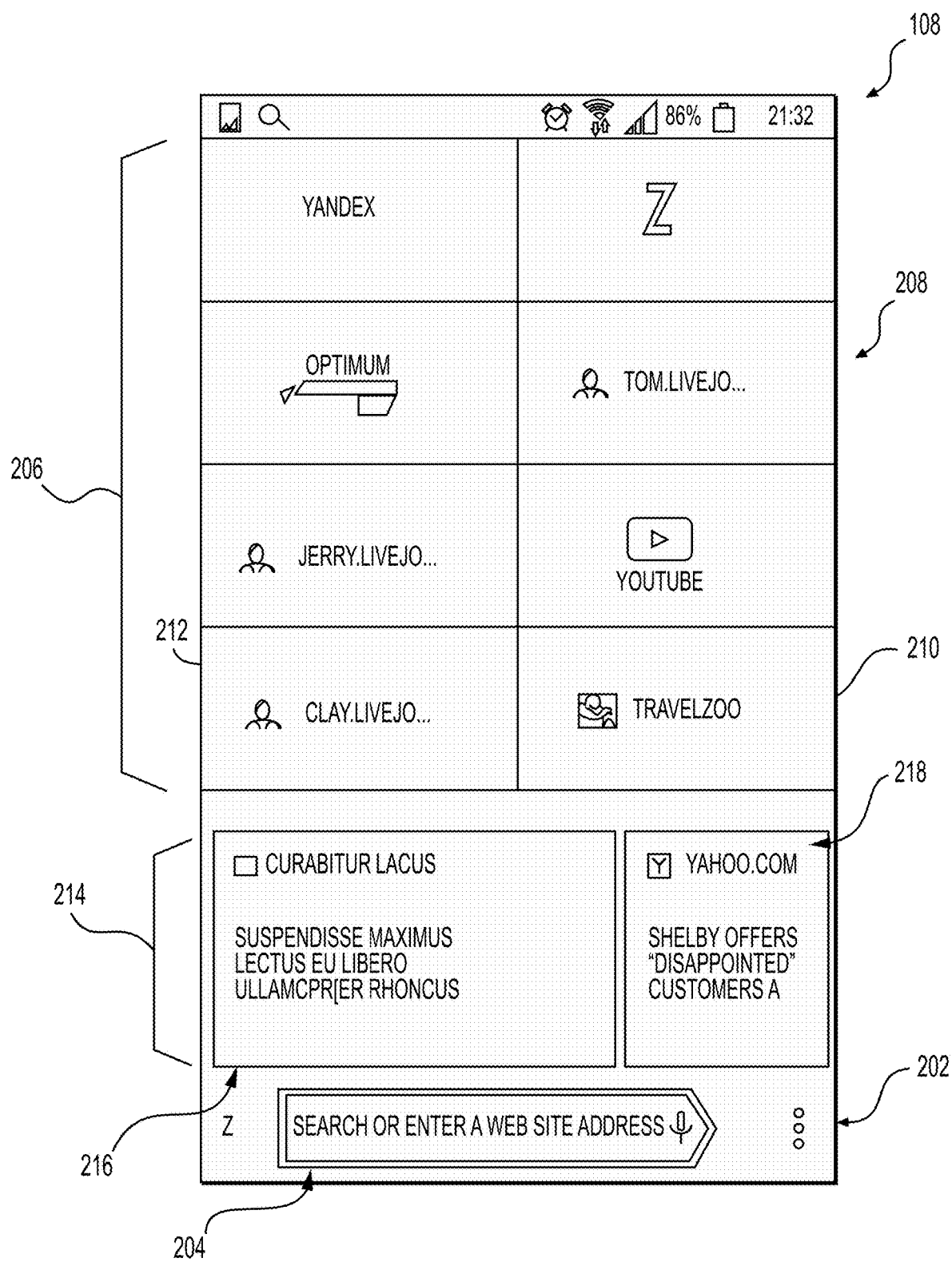
FIG. 2 depicts a screen shot of a recommendation interface implemented in accordance with a non-limiting embodiment of the present technology, the recommendation interface being depicted as displayed on the screen of an electronic device of the system of FIG. 1, the electronic device being implemented as a smart phone.

Generally speaking, the recommendation application 106 comprises a recommendation interface 108, the recommendation interface 108 being displayed on a screen (not separately numbered) of the electronic device 104. With reference to FIG. 2, there is depicted a screen shot of the recommendation interface 108 implemented in accordance with a non-limiting embodiment of the present technology (the example of the recommendation interface 108 being depicted as displayed on the screen of the electronic device 104 being implemented as a smart phone).

In some embodiments of the present technology the recommendation interface 108 is presented when the user 102 of the electronic device 104 actuates (i.e. executes, run, background-run or the like) the recommendation application 106. Alternatively, the recommendation interface 108 can be presented when the user 102 opens a new browser window and/or activates a new tab in the browser application. For example, in some embodiments of the present technology, the recommendation interface 108 can act as a "home screen" in the browser application.

The recommendation interface 108 includes a search interface 202. The search interface 202 includes a search query interface 204. The search query interface 204 can be implemented as an "omnibox" which allows entry of a search query for executing a search or a network address (such as a Universal Remote Locator) for identifying a network resource (such as a web site) to be accessed. However, the search query interface 204 can be implemented as configured to receive one or both of: entry of the search query for executing the search or the network address (such as a Universal Remote Locator) for identifying the network resource (such as a web site) to be accessed.

The recommendation interface 108 further includes a links interface 206. The links interface 206 includes a plurality of tiles 208—of which eight are depicted in FIG. 2—only two of which are numbered in FIG. 2—a first tile 210 and a second tile 212.

Using the example of the first tile 210 and the second tile 212—each of the plurality of tiles 208 includes (or acts as) a link to either (i) a web site marked as "favourite" or otherwise marked by the user 102, (ii) a previously visited web site or (iii) the like. The plurality of tiles 208, in the depicted embodiment, is visually presented to the user 102 as square buttons with a logo and/or a name of the resource depicted therein, the logo and the name for enabling the user 102 to identify which resource the particular one of the plurality of tiles (not separately numbered) is linked to. However, it should be expressly understood that the visual representation of some or all of the plurality of tiles 208 can be different. As such, some or all of the plurality of tiles 208 can be implemented as differently shaped buttons, as hyperlinks presented in a list or the like.

As an example, the first tile 210 contains a link to a TRAVELZOO™ web site and the second tile 212 contains a link to a personal live journal web site. Needless to say, the number and content of the individual ones of the plurality of tiles 208 is not particularly limited.

For example, the number of the tiles within the plurality of tiles 208 can be pre-selected by the provider of the recommendation application 106. In some embodiments of the present technology, the number of tiles within the plurality of tiles 208 is pre-selected based on the size and/or resolution of the screen of the electronic device 104 executing the recommendation application 106. For example, a first number of tiles can be pre-selected for the electronic device 104 executed as a smartphone, a second number of tiles can be pre-selected for the electronic device 104 executed as a tablet, and a third number of tiles can be pre-selected for the electronic device 104 executed as a laptop or desktop computer.

The recommendation interface 108 further includes a digital content recommendation 214. The digital content recommendation 214 includes one or more recommended content items, such as a first recommended content item 216 and a second recommended content item 218 (the second recommended content item 218 only partially visible in FIG. 2). Naturally, the digital content recommendation 214 can have more recommended content items. In the embodiment depicted in FIG. 2 and in those embodiments where more than one recommended content item are present, the user 102 can scroll through the digital content recommendation 214. The scrolling can be achieved by any suitable means. For example, the user 102 can scroll the content of the digital content recommendation 214 by means of actuating a mouse device (not depicted), a key board key (not depicted) or interacting with a touch-sensitive screen (not depicted) or associated with the electronic device 104.

In response to the user clicking one of the first recommended content item 216 or the second recommended content item 218, the user is directed to a website associated with the first recommended content item 216 or the second recommended content item 218.

Examples provided in FIG. 2 is just one possible implementation of the recommendation interface 108. Another example of the implementation of the recommendation interface 108, as well as an explanation of how the user 102 can interact with the recommendation interface 108 is disclosed in a co-owned Russian Patent Application entitled A COMPUTER-IMPLEMENTED METHOD OF GENERATING A CONTENT RECOMMENDATION INTERFACE, filed on May 12, 2016, and bearing an application number 2016118519; content of which is incorporated by reference herein in its entirety.

How the content for the digital content recommendation 214 is generated will be described in greater detail herein below.

Returning to the description of FIG. 1, the electronic device 104 comprises a communication interface (not depicted) for two-way communication with a communication network 110 via a communication link 111. In some non-limiting embodiments of the present technology, the communication network 110 can be implemented as the Internet. In other embodiments of the present technology, the communication network 110 can be implemented differently, such as any wide-area communication network, local-area communication network, a private communication network and the like.

How the communication link 111 is implemented is not particularly limited and depends on how the electronic device 104 is implemented. Merely as an example and not as a limitation, in those embodiments of the present technology where the electronic device 104 is implemented as a wireless communication device (such as a smart phone), the communication link 111 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 104, the communication link 111 and the communication network 110 are provided for illustration purposes only. As such, those skilled in the art will easily appreciate other specific implementational details for the electronic device 104, the communication link 111, and the communication network 110. As such, by no means the examples provided hereinabove are meant to limit the scope of the present technology.

The system 100 further includes a recommendation server 112. The recommendation server 112 can be implemented as a conventional computer server. In an example of an embodiment of the present technology, the recommendation server 112 can be implemented as a Dell™ PowerEdge™ Server running the Microsoft™ Windows Server™ operating system. Needless to say, the recommendation server 112 can be implemented in any other suitable hardware, software, and/or firmware, or a combination thereof. In the depicted non-limiting embodiments of the present technology, the recommendation server 112 is a single server. In alternative non-limiting embodiments of the present technology, the functionality of the recommendation server 112 may be distributed and may be implemented via multiple servers.

The recommendation server 112 comprises a communication interface (not depicted) structured and configured to communicate with various entities (such as the electronic device 104 and other devices potentially coupled to the communication network 110) via the communication network 110. Similar to the electronic device 104, the recommendation server 112 comprises a server memory 114 which comprises one or more storage media and generally provides a place to store computer-executable program instructions executable by a server processor 116. By way of example, the server memory 114 may be implemented as a tangible computer-readable storage medium including Read-Only Memory (ROM) and/or Random-Access Memory (RAM). The server memory 114 may also include one or more fixed storage devices in the form of, by way of example, hard drives (HDDs), solid-state drives (SSDs), and flash-memory cards.

In some embodiments, the recommendation server 112 can be operated by the same entity that has provided the afore-described recommendation application 106. For example, if the recommendation application 106 is a Yandex.Zen™ recommendation system, the recommendation server 112 can be operated by Yandex LLC of Lev Tolstoy Street, No. 16, Moscow, 119021, Russia. In alternative embodiments, the recommendation server 112 can be operated by an entity different from the one who has provided by the aforementioned recommendation application 106.

In accordance with the present technology, the recommendation server 112 is configured to execute a content selection application 118. The manner in which the content selection application 118 is implemented is described in detail below. For now, suffice it to say that the content selection application 118 is configured to select one or more content items as the digital content recommendation 214.

To that end, the recommendation server 112 is communicatively coupled to a database 120 via a dedicated link (not numbered). In alternative implementations, the database 120 may be communicatively coupled to the recommendation server 112 via the communication network 110 without departing from the teachings of the present technology. Although the database 120 is illustrated schematically herein as a single entity, it is contemplated that the database 120 may be configured in a distributed manner.

The database 120 is populated with a plurality of digital content items. Just as an illustration within FIG. 1, the database 120 includes a first content item 122 a second content item 124, and a third content item 126. In the context of the present specification, the term "content item" may refer to web resources associated with:
 a news item;
 a publication;
 a web resource;
 a post on a social media web site;
 a new item to be downloaded from an application store;
 a new song (music track) to play/download from a resource;
 an audiobook to play/download from a resource;
 a podcast to play/download from a resource;
 a new movie (video clip) to play/download from a resource; and
 a product to be bought from a resource.

Broadly speaking, the plurality of content items can be divided into two types of content item based on their source.

For example, the first content item 122 and the second content item 124 may be "native" content items to the recommendation system, meaning that the first content item 122 and the second content item 124 originate from a respective first native content channel and second native channel, which are affiliated with the recommendation application 106. As such, in some embodiments of the present technology, the recommendation server 112 may provide a platform for digital content generation and publication. This can be particularly convenient for those users of the recommendation server 112 who wish to publish digital content but do not wish to spend time and/or money for establishing a publication platform. It is noted that the publication platform provided by the recommendation server 112 can be provided based on a subscription, in exchange for the subscribers having to watch ads and/or for free. Just as an example, the first native content channel may be associated with a blogger that publishes content items (such as the first content item 122) using the recommendation application 106 as a platform. Generally speaking, not only the user 102 can access the first content item 122, the recommendation application 106 allows access to the first native content channel, thereby allowing the user 102 to see the one or more content items generated by the first native content channel.

On the other hand, the third content item 126 can be "non-native" to the recommendation system, meaning that the third content item 126 originates from a non-native content channel or, in other words, from a content source that is external to the recommendation server 112. For example, the third content item 126 may be a news item published on the web from an entity not affiliated with the recommendation application 106. As such, the recommendation server 112 is also configured to execute a crawling function to gather non-native content items coupled to the communication network 110, and to that end comprises a crawler application (not shown). Generally speaking, the crawler application is configured to periodically access web hosting servers (not shown) coupled to the communication network 110 to identify and store within the database 120 the non-native content items stored therein.

Generally speaking, each native content item (such as the first content item 122 and the second content item 124) can be associated with a respective display feature. The display feature is indicative of a required minimum number of displays of the one or more content items originating from the associated native content channel by the recommendation application 106 within a predetermined time period. For example, let us assume that the first content item 122 originates from a first native content channel, which is associated with a given content publisher (not shown).

Thus, by providing one or more content items, the given content publisher is guaranteed a certain amount of visibility by the recommendation application 106, such as a minimum number of displays of the one or more content items generated by the first native content channel. How the minimum number of displays is determined is not limited, and may for example be proportional to the number of content items originating from the associated native content channel. Thus, for example, if a single content item is published by the native content source, the minimum number of displays can be 100 times; for two content items, the minimum number of displays can be 200 times, and so on.

How the predetermined time period is implemented is not limited, and may for example be a day, a week, two weeks or a month and the like, and may be set by the operator of the content selection application 118. It is further contemplated that the predetermined time period is the same for all native content channels (such as the first naive content channel and the second native content channel), but it is not limited as such, and each native content channel may have a different predetermined time period from one another.

Content Selection Application

Figure 3:
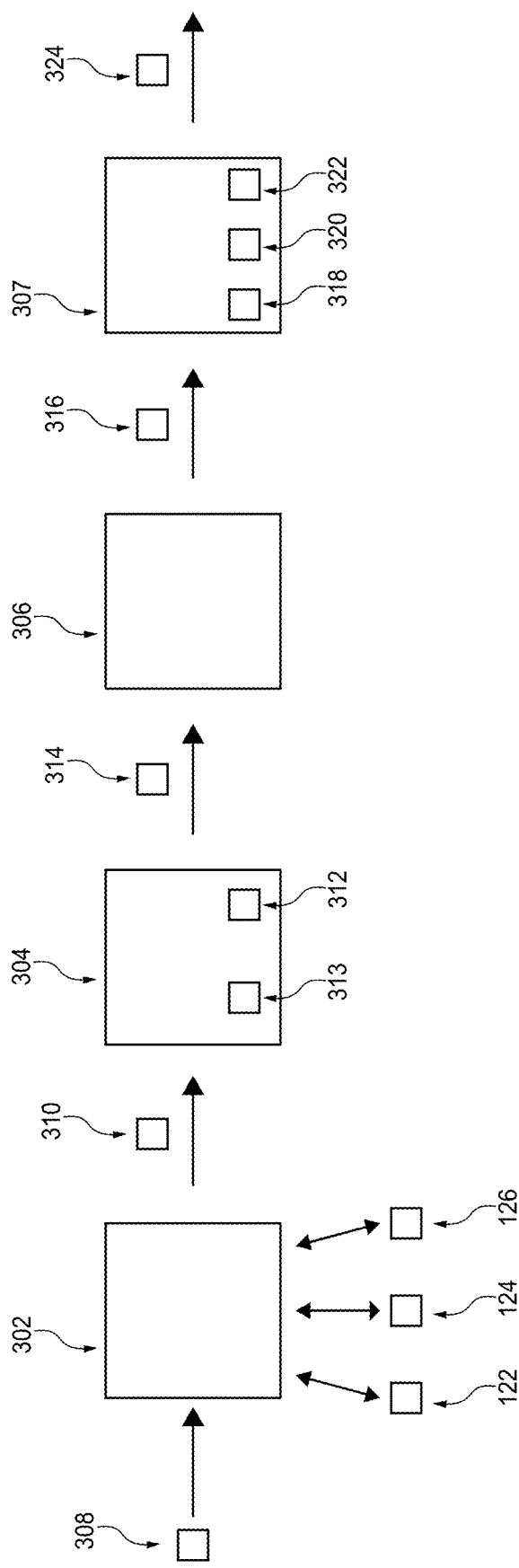
FIG. 3 depicts an example of a process of generating a digital content recommendation.

With reference to FIG. 3, there is provided a schematic illustration of the content selection application 118 being implemented in accordance with non-limiting embodiments of the present technology. The content selection application 118 executes (or otherwise has access to): a content item selection routine 302, a relevancy determining routine 304, a prediction routine 306, and a ranking routine 307.

In the context of the present specification, the term "routine" refers to a subset of the computer executable program instructions of the content selection application 118 that is executable by the server processor 116 to perform the functions explained below in association with the various routines (the content item selection routine 302, the relevancy determining routine 304, the prediction routine 306 and the ranking routine 307). For the avoidance of any doubt, it should be expressly understood that the content item selection routine 302, the relevancy determining routine 304, the prediction routine 306, and the ranking routine 307 are illustrated schematically herein as separate entities for ease of explanation of the processes executed by the content selection application 118. It is contemplated that some or all of the content item selection routine 302, the relevancy determining routine 304, the prediction routine 306 and the ranking routine 307 may be implemented as one or more combined routines.

For ease of understanding the present technology, functionality of each one of the content item selection routine 302, the relevancy determining routine 304, the prediction routine 306 and the ranking routine 307, as well as data and/or information processed or stored therein are described below.

Content Item Selection Routine

The content item selection routine 302 is configured to receive a data packet 308 from the electronic device 104. The data packet 308 comprises a request by the electronic device 104 for the digital content recommendation 214. The manner in which the data packet 308 is transmitted from the electronic device 104 to the content item selection routine 302 is not limited, and may for example be transmitted in response to the user 102 accessing the recommendation application 106.

Upon receiving the data packet 308, the content item selection routine 302 is configured to select a set of candidate content items responsive to the request contained within the data packet 308.

Just as an example, the content item selection routine 302 may be configured to select one or more candidate content items which may be potentially relevant to the user 102 based on a user interest profile associated with the user 102, which may for example be a set of vectors representing the interests of the user 102.

The manner in which the user interest profile is determined is not limited. Just as an example, the data packet 308 may comprise a unique ID associated with the electronic device 104 or with the user 102, which allows the recommendation server 112 to retrieve interactions of the user 102 executed previously on the recommendation application 106 with regards to a plurality of content items. Examples of interactions that may be stored, and consequently retrieved by the recommendation server 112 include, but are not limited to:

The user preferences inputted by the user 102;
The user 102 "scrolling over" the given content item;
The user 102 "liking" or "disliking" the given content item or the content channel associated with the given content item;
The user 102 sharing the given content item;
The user 102 clicking (or otherwise selecting) the given content item; and
The user 102 spending time consulting the given content item.

It is further contemplated that the recommendation server 112 has access to logs (not shown). Broadly speaking, the logs can store previously collected data associated with the electronic device 102 or the user's 104 network interaction via the browser application (not shown) and the search query interface 204. In some non-limiting embodiments, the logs comprise two kinds of logs: a search history log (not depicted) and a browsing history log (no depicted). Generally speaking, the "search strings" which the user 102 inputs to the search query interface 204, and search action data of the user 102 are stored in the search history logs, and the browsing history logs store indication of the web content browsed by the user 102 via the browser application.

The manner in which the search history log is populated is well known in the art, and will not be described herein. Suffice to say, however that the recommendation server 112 is configured to collect and store the "search strings" inputted into the search query interface 204 as well as the activities of the user 102 with the search results.

It is noted that logs can store the historical information in an encrypted and/or anonymized form.

As such, based on the unique ID associated with the electronic device 104 or with the user 102, the recommendation server 112 is configured to retrieve a search history and a browsing history associated with the electronic device 104 or with the user 102. In some embodiments, the browsing history and the search history may be limited in time or in action. Just as an example, the browsing history may comprise web resources visited in the previous 24 hours, or the last 100 web resources visited. Similarly, the search history may comprise the search strings inputted in the previous 24 hours, or the last 100 search strings. Needless to say, other time period or actions may be used.

It is further contemplated that the data packet 308 may comprise a location of the electronic device 104.

Thus, based on the user interactions the user interest profile is generated, and one or more candidate content items that may be of interest to the user 102 are selected. An example of generating the user interest profile is disclosed in U.S. Pat. No. 9,740,782 entitled METHOD FOR ESTIMATING USER INTERESTS issued on Aug. 22, 2017, content of which is incorporated by reference herein in its entirety.

In the illustration, the set of candidate content items comprise the first content item 122, the second content item 124 and the third content item 126. Needless to say, it is contemplated that the set of candidate content items include more or less than three content items. Each of the first content item 122, the second content item 124 and the third content item 126 is associated with a respective set of content item features (described below).

Relevancy Determining Routine

Once the set of candidate content items have been determined, the content item selection routine 302 is configured to transmit a data packet 310 to the relevancy determining routine 304. The data packet 310 comprises the set of candidate content items (i.e. the first content item 122, the second content item 124, and the third content item 126).

Recalling that the first content item 122, the second content item 124 and the third content item 126 have been selected as being potentially relevant to the user 102 based on the user interest profile associated with the user 102, the relevancy determining routine 304 is, on the other hand, configured to determine the relevancy of each of the candidate content items included within the set of candidate content items, by determining a relevancy parameter to each of the content items included within the set of candidate content items (i.e. such as the first content item 122, the second content item 124 and the third content item 126).

The manner in which the relevancy parameter for each of the candidate content items is determined is not limited and may be determined based on the type of features included within the associated set of content item features.

In accordance with the present technology, the set of content item features may comprise content-inherent features. The content-inherent features include content item-inherent characteristics that are associated with the content item. Just as an example, the content-inherent features may include the author of the content item, the length of the document measured in words or symbols, category/theme of the content, the number of previous display on the recommendation interface 108, the click through rate and the like.

As such, the relevancy determining routine 304 is configured to execute a first machine learning algorithm 312 that is trained to determine the relevancy parameter of the first content item 122, the second content item 124, and the third content item 126 based at least in part of the respective content-inherent features and the user interest profile. The manner in which the relevancy parameter is implemented is not limited, and may for example be a predicted likelihood of the user clicking the given content item.

It is further contemplated that instead of content-inherent features, the set of content item features comprises channel-inherent features, which are indicative of content channel characteristics. For example, the channel-inherent features for the first content item 122 include:
- a total number of users that have accessed the first content channel;
- a number of the one or more content items from the first content channel that has been selected by each of the users.

The relevancy determining routine 304 is configured analyze the channel-inherent features to determine the clicking activities of the users accessing the associated content channel. Just as an example, let us assume that the first content channel comprises 10 content items and 10 users have accessed the first content channel, the following Table 1 illustrates the clicking activities of the 10 users.

TABLE 1

| Number of users (total of 10 users) | Number of content items from the first channel clicked | Clicked rate |
| --- | --- | --- |
| 1 | 3 | 30% |
| 4 | 6 | 60% |
| 5 | 1 | 10% |

As illustrated, out of 10 users that has accessed the first content channel, a single user has clicked on 3 content items out of 10 content items (thus having a clicked rate of 30%), 4 of the 10 users have clicked on 6 content items (thus having a clicked rate of 60%), and 5 of the 10 users have clicked on 1 content item (thus having a clicked rate of 10%).

Figure 4:
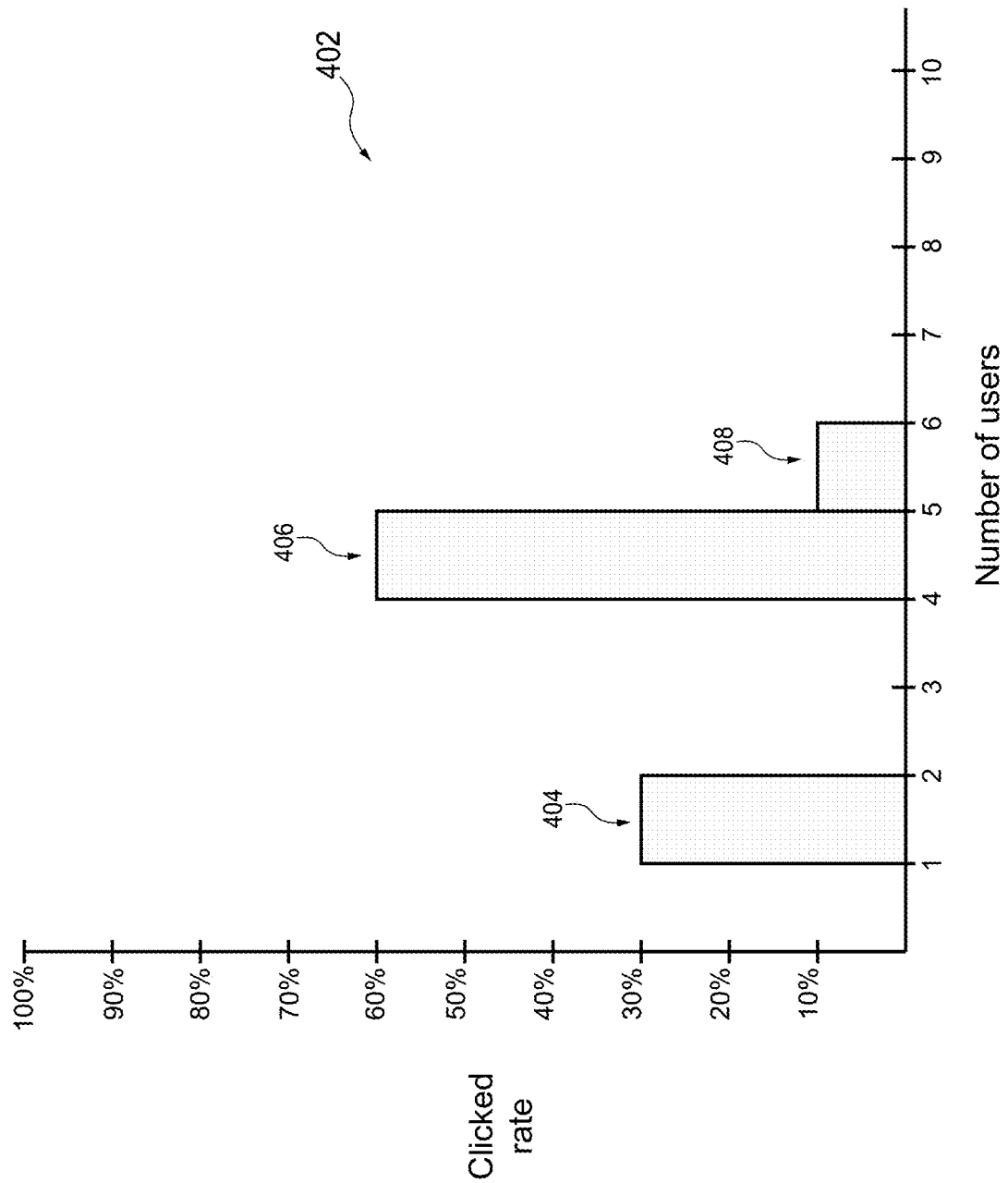
FIG. 4 depicts a histogram generated by a second machine learning algorithm executed as part of the process of FIG. 3.

Briefly turning the attention to FIG. 4, the manner in which the relevancy parameter is determined based on the channel-inherent features will be discussed. Based on the Table 1, the relevancy determining routine 304 is configured to generate a histogram 402 which represents the distribution of the subsets of users by clicked rate.

Thus, for example, looking at the histogram 402, there is provided a plurality of subsets each representing a subset of users, and each of the subset is associated with a clicked rate. Namely, a first subset 404 represents the single user that has clicked 30% of the content items, a second subset 406 represents the 4 users that have clicked 60% of the content items, and a third subset 408 represents the 5 users that have clicked 10% of the content items.

The relevancy determining routine 304 is further configured to associate the relevancy parameter to each of the subset. More precisely, the relevancy determining routine 304 is configured to assign a predefined relevancy parameter based on the associated clicked rate. For example, if the clicked rate is 10%, then the assigned relevancy corresponds to 10 (on a scale of 100), and if the clicked rate is 40%, then the assigned relevancy corresponds to 40 (also on a scale of 100), and so on. Needless to say, it is contemplated that other means of associating the relevancy parameter to each of the subset may be used, namely by determining the relevancy parameter as a function of the clicked rate.

Just as an example, the following Table 2 illustrates the predefined relevancy parameter assigned to the three subsets.

TABLE 2

| Subset | Clicked rate | Ranking | Assigned relevancy parameter |
| --- | --- | --- | --- |
| First subset 404 | 30% | 2 | 30 |
| Second subset 406 | 60% | 1 | 60 |
| Third subset 408 | 10% | 3 | 10 |

As illustrated in Table 2, the second subset 406 (which has 60% of clicked rate) is ranked highest due to its highest clicked rate, and therefore is assigned a highest relevancy parameter. On the other hand, the third subset 408 (which has 10% of clicked rate) is ranked lowest due to its lowest clicked rate, and therefore is assigned a lowest relevancy parameter.

Having assigned a relevancy parameter to each of the subset illustrating the clicked rate of the previous users who have accessed the first content channel, the relevancy determining routine 304 is configured to execute a second machine learning algorithm 313 (see FIG. 2) that is trained to predict in which subset (i.e. one of the first subset 404, the second subset 406, and the third subset 408) the user 102 would fall into.

Just as an example, the second machine learning algorithm 313 may be configured to determine an average user interest profile for each of the subset by analyzing the user interest profiles for each of the subsets by analyzing the user interest profiles of the users associated with each of the subset. For example, taking the second subset 406 as an example, the second machine learning algorithm 313 is configured to determine the average user interest profile of the 4 users (see Table 1) that have clicked 60% of the content items from the first content channel.

Once the average user interest profiles have been determined, the second machine learning algorithm 313 is configured to determine a degree of similarity with the user interest profile of the user 102. Recalling that the user interest profile may be implemented as a set of vectors, the degree of similarity may be determined by calculating the distance between the set of vectors of the user interest profile of the user 102 and the average user interest profiles.

Once the second machine learning algorithm 313 has predicted the subset associated with the user 102, the given content item is assigned the relevancy parameter associated with the subset. For example, let us assume that the user interest profile of the user 102 is determined to be most similar to the average user interest profile of associated with the second subset 406. Recalling that the second subset 406 has been previously assigned the relevancy parameter by the relevancy determining routine 304 (see Table 2), the first content item 122 is assigned the same relevancy parameter (thus being assigned the relevancy parameter corresponding to 60).

It would be understood from the above that the relevancy parameter determined by the first machine learning algorithm 312 is determined based on the content-inherent features and the user interest profile, and can thus be considered to be a content item specific relevancy vis-a-vis the user 102. On the other hand, the relevancy parameter determined by the second machine learning algorithm 313 is determined based on the channel-inherent features and thus the relevancy of the content item can be considered to be a channel specific relevancy vis-a-vis the user 102.

Prediction Routine

Returning now to FIG. 3, once the relevancy parameter for each content item included within the set of candidate content items has been determined, the relevancy determining routine 304 is configured to transmit a data packet 314 to the prediction routine 306. The data packet 314 comprises the relevancy parameter of the first content item 122, the second content item 124 and the third content item 126.

As has been briefly discussed above, the first content item 122 and the second content item 124 are both native content items, and as such are associated with a respective display feature.

Based on the display feature, the prediction routine 306 is configured to determine a completion parameter of the first content item 122 and the second content item 124. For example, the completion parameter represents a degree of each of the first content channel (which is associated with the first content item 122) and the second content channel (which is associated with the second content item 124) meeting its respective number of displays within the predetermined period of time.

The manner in which the prediction routine 306 determines the completion parameter is not limited and may be done by analyzing one of two values, namely (i) an up-to-date displayed value; and (ii) a predictive completion parameter.

The up-to-date displayed value corresponds to the number of one or more content items originating from the associated content channel an that have been displayed prior to the receiving the data packet 308.

Thus, if for example, the first content channel has three published content items have been displayed 300 times in total within the predetermined time period, the up-to-date displayed value corresponds to 300.

On the other hand, the predictive completion parameter is indicative of a predicted number of displays of the one or more content items of the associated content channel within the predetermined time period. This is based on the developer's observation that the displaying of the one or more content items is not constant, and may depend on various factors, such as time of the day, the day of the week and the like. As such, the prediction routine 306 may execute a predictive algorithm (not shown) to determine the predictive completion parameter based at least on the up-to-date displayed value. For example, for a given 24-hour time interval, the prediction routine 306 may have observed that a particular channel interest amongst users spikes around 3 pm in the afternoon. Thus, if the prediction routine 306 analyzes the predictive completion parameter in the morning, the prediction routine 306 will "bias" the value upwards to account for the "spike" that will occur at 3 pm.

The manner in which the completion parameter is implemented is not limited, and may be represented as an absolute number of displays required to achieve the minimum display value, as a percentage value representing a rate of completing the minimum display value, and the like.

It would be understood that since the third content item 126 is a non-native content item, it does not have any display feature associated thereto. As such, the prediction routine 306 does not calculate a completion routine for the third content item 126.

Ranking Routine

Having determined the relevancy parameter of the first content item 122 and the second content item 124, the prediction routine 306 is configured to transmit a data packet 316 to the ranking routine 307. The data packet 316 comprises the relevancy parameter and the completion parameter of the first content item 122 and the second content item 124, as well as the relevancy parameter of the third content item 126.

The ranking routine 307 is configured to rank the first content item 122, the second content item 124 and the third content item 126, as explained below.

As it will be apparent from the following description, native content items (such as the first content item 122 and the second content item 124) and the non-native content items (such as the third content item 126) will be ranked separately. More precisely, the native content items are ranked based on their respective relevancy parameter and completion parameter, whereas the non-native content items are ranked based on their respective relevancy parameter only.

Attention will first be turned to the ranking of the first content item 122 and the second content item 124 which are both native content items. The ranking routine 307 is configured to rank, using a first ranking algorithm 318, the first content item 122 and the second content item 124 based on their respective relevancy parameter and their respective completion parameter.

In some embodiments, the first ranking algorithm 318 is configured to multiply the relevancy parameter of the first content item 122 with the completion parameter of the first content item 122 to obtain a first ranking score. Additionally, the ranking routine 307 is configured to multiply the relevancy parameter of the second content item 124 with the completion parameter of the second content item 124 to obtain a second ranking score. The following Table 3 illustrates the respective relevancy parameter and the completion parameter of the first content item 122 and the second content item 124, as well as the first and second ranking scores.

TABLE 3

| | Relevancy parameter | Completion parameter (remaining number of displays) | Ranking score |
|---|---|---|---|
| First content item 122 | 80 | 10 | 800 |
| Second content item 124 | 60 | 20 | 1200 |

As illustrated above, the first content item 122 has a relevancy parameter that is above the second content item 124. However, since the completion parameter (represented as the remaining number of displays) of the second content item 124 is above the first content item 122, the second ranking score is above the first ranking score.

Accordingly, despite the fact that the first content item 122 is a priori more relevant to the request, the first ranking algorithm 318 is configured to rank the second content item 124 above the first content item 122 due to the fact that the second content channel (which is associated with the second content item 124) requires more displays to achieve the minimum display value.

Needless to say, it is contemplated that the first ranking algorithm 318 may be configured to apply restricting measures. Just as an example, the first ranking algorithm 318 may be configured to first determine if the difference between the relevancy parameters of the first content item 122 and the second content item 124 is above a first predetermined threshold. As such, even if the second ranking score is above the first ranking score, if it is determined that the relevancy parameter of the second content item 124 is above the first predetermined threshold, the first ranking algorithm 318 is configured to rank the first content item 122 above the second content item 124. The manner in which the first predetermined threshold is determined is not limited, and may be determined empirically.

This is based on the developer's awareness that a balance needs to be achieved between the relevancy of the content item and the need to display the content item to maintain an acceptable level of user satisfaction.

Needless to say, it is also contemplated that the first and second ranking scores may be determined using any other function of the completion parameter and the relevancy parameter (such as a linear combination), rather than multiplying the completion parameter and the relevancy parameter.

In another embodiment, the first ranking algorithm 318 is configured to rank the first content item 122 and the second content item 124 based on their respective relevancy parameters. The first ranking algorithm 318 is then configured to determine if the completion parameter of the lower ranked content item (in the example above, the second content item 124) is above a second predetermined threshold. If the completion parameter of the lower ranked content item is above the second predetermined threshold, the lower ranked content item is ranked above the higher ranked content item. The manner in which the second predetermined threshold is determined is not limited, and may be determined empirically. Needless to say, it is contemplated that the first ranking algorithm 318 ranks the first content item 122 and the second content item 125 based on their respective completion parameter and apply the second predetermined threshold vis-a-vis their respective relevancy parameters.

In yet another embodiment, the first ranking algorithm 318 is configured to rank the first content item 122 and the second content item 124 based on their respective relevancy parameters. The first ranking algorithm 318 is then configured to determine if the completion parameter of one of the first content item 122 and the second content item 124 is below a third predetermined threshold. In the affirmative, the associated content item is not included in the final recommended list of digital items.

On the other hand, if the completion parameter of the respective first content item 122 and the second content item 124 is above the third predetermined threshold, the first content item 122 and the second content item 124 are kept in the final recommended digital content items (while keeping their ranking). The manner in which the third predetermined threshold is determined is not limited, and may be determined empirically. Needless to say, it is contemplated that the first ranking algorithm 318 ranks the first content item 122 and the second content item 125 based on their respective completion parameter and apply the third predetermined threshold vis-a-vis their respective relevancy parameters.

Having ranked the first content item 122 and the second content item 124, attention will now be turned at the ranking of the non-native content items.

The ranking routine 307 is configured to execute a second ranking algorithm 320. Unlike the first ranking algorithm 318 that is configured to rank the native content items (such as the first content item 122 and the second content item 124), the second ranking algorithm 320 is configured to rank and assign a respective ranking score to the one or more non-native content items included in the set of candidate content items (such as the third content item 126). Thus, the third content item 126 is assigned a third ranking score by the second ranking algorithm 320. The manner in which the second ranking algorithm 320 ranks the one or more non-native content items is not limited, and may for example rank the one or more non-native content items based on their relevancy parameters determined by the relevancy determining routine 304.

Once the second ranking algorithm 320 has ranked the one or more non-native content items, the ranking routine 307 then executes a blending algorithm 322. The blending algorithm 322 is configured to rank the first content item 122, the second content item 124 and the third content item 126.

The manner in which the blending algorithm 322 is configured to rank the native content items (i.e. the first content item 122 and the second content item 124) and the non-native content items (i.e. the third content item 126) is not limited, and may for example be done using techniques disclosed in the U.S. patent application Ser. No. 15/891,813 entitled METHOD AND SYSTEM FOR DETERMINING RANK POSITIONS OF NON-NATIVE ITEMS BY A RANKING SYSTEM, filed on Feb. 8, 2018, content of which is incorporated by reference in its entirety.

In another embodiment, the blending algorithm 322 may be configured to rank the third content item 126 vis-a-vis the first content item 122 and the second content item 124 based solely on its relevance parameter. Returning to Table 2 to illustrate, we note that the second content item 124 is ranked higher than the first content item 122 due to their respective ranking scores. If, for example, the relevance parameter of the third content item 126 was above the relevance parameter of the second content item 124, then the blending algorithm 322 is configured to rank the third content item 126 above the second content item 124, and vice-versa. Thus, in the example, the third content item 126 would be ranked the highest, followed by the second content item 124 and the first content item 122.

In another example, blending algorithm 322 may be configured to rank the first content item 122, the second content item 124 and the third content item 126 based on a predetermined pattern. For example, the blending algorithm 322 may be configured to rank the highest native content item based on its ranking score, followed by the highest non-native content item based on its ranking score, then followed by the second-highest native content item based on its ranking score, and so on. Needless to say, other patterns for ranking the native and non-native content items are contemplated as well.

Once the blending algorithm 322 has ranked the first content item 122, the second content item 124 and the third content item 126, the ranking routine 307 is configured to select a subset of candidate content items by applying a predefined inclusion parameter indicative of an acceptable number of content items to be included within the digital content recommendation 214 for display by the electronic device 104.

The manner in which the predefined inclusion parameter is implemented is not limited and may for example include the top 2 higher ranked content items by the blending algorithm 322. Needless to say, the predefined inclusion parameter may include more or less than 2 higher ranked content items.

In some embodiments, the predefined inclusion parameter may be configured to select a predefined number of higher ranked native content items and non-native content items. For example, the predefined inclusion parameter may be configured to select the top 5 higher ranked native content items and the top 7 higher ranked non-native content items.

Having generated the digital content recommendation 214, the ranking routine 307 is configured to transmit a data packet 324 to the electronic device 104. The data packet 324 comprises the digital content recommendation 214 for display by the electronic device 104.

The various non-limiting embodiments of the present technology may allow the generating of digital content recommendation 214 balancing the need to provide relevant content items to the request and the need to meet the required minimum number of displays of content items originating from the native content channels.

Figure 5:
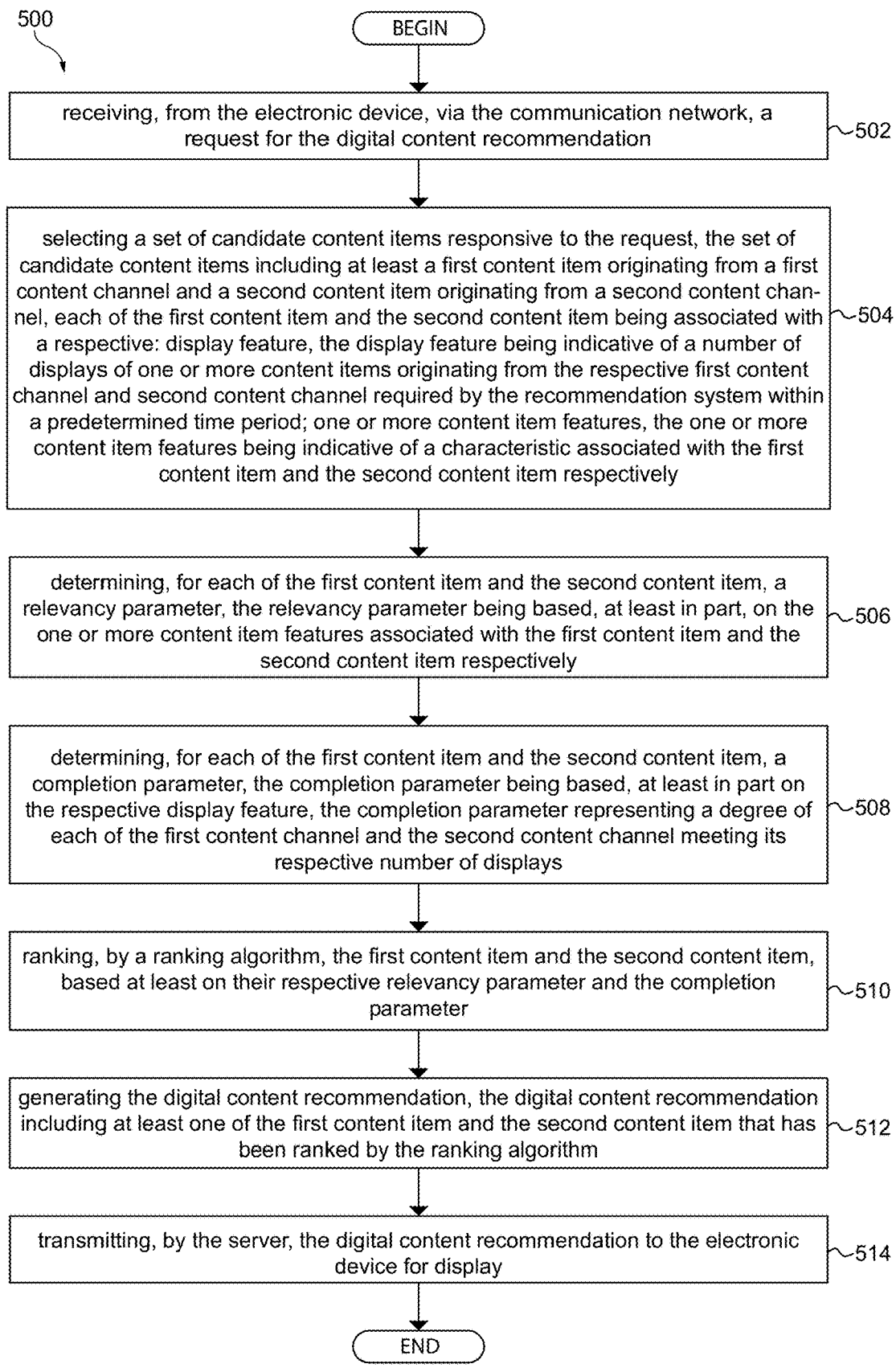
FIG. 5 depicts a block diagram of a flow chart of a method of generating a digital content recommendation.

Given the architecture and examples provided hereinabove, it is possible to execute a computer-implemented method for generating the digital content recommendation 214. With reference to FIG. 5, there is depicted a flow chart of a method 500 for generating the digital content recommendation 214, the method 500 being executable in accordance with non-limiting embodiments of the present technology. The method 500 can be executed by the recommendation server 112.

Step 502: receiving, from the electronic device, via the communication network, a request for the digital content recommendation The method 500 starts at step 502, where the content item selection routine 302 acquires the data packet 308 from the electronic device 104 which comprises a request for digital content recommendation 214. The manner in which the electronic device 104 transmits the data packet 308 is not limited, and may for example be in response to the user 102 accessing the recommendation application 106.

Step 504: selecting a set of candidate content items responsive to the request, the set of candidate content items including at least a first content item originating from a first content channel and a second content item originating from a second content channel, each of the first content item and the second content item being associated with a respective: display feature, the display feature being indicative of a number of displays of one or more content items originating from the respective first content channel and second content channel required by the recommendation system within a predetermined time period; one or more content item features, the one or more content item features being indicative of a characteristic associated with the first content item and the second content item respectively At step 504, the content item selection routine 302 selects the set of candidate content items in response to the request, which includes the first content item 122 and the second content item 124. The first content item 122 originates from the first content channel, and the second content item 124 originates from the second content channel.

Each of the first content item 122 and the second content item 124 is associated with a respective display feature and one or more content item features.

The display feature is indicative of a required minimum number of displays of one or more content items originating from the associated content channel by the recommendation application 106 within a predetermined time period.

In some embodiments, the set of content item features may comprise of content-inherent features and/or channel-inherent features. The content-inherent features include content item-inherent characteristics that are associated with the content item. Just as an example, the set of content item features may include the author of the content item, the length of the document measured in words or symbols; category/theme of the content, the number of previous displays on the recommendation interface 108, the click through rate and the like.

On the other hand, the channel-inherent features include content channel characteristics. For example, the channel-inherent features of the first content channel include:
 a total number of users that have accessed the first content channel;
 a number of the one or more content items from the first content channel that has been selected by each of the users.

Step 506: determining, for each of the first content item and the second content item, a relevancy parameter, the relevancy parameter being based, at least in part, on the one or more content item features associated with the first content item and the second content item respectively At step 506, the relevancy determining routine 304 is configured to determine the relevancy parameter for each of the first content item 122 and the second content item 124.

The step of determining the relevancy parameter for each of the first content item 122 and the second content item 124 is executed by one of the first machine learning algorithm 312 or the second machine learning algorithm 313.

In using the first machine learning algorithm 312, the relevancy parameter of the first content item 122 and the second content item 124 is determined based on an analysis of the respective content-inherent features and the user interest profile of the user 102.

In using the second machine learning algorithm, the relevancy parameter of the first content item 122 and the second content item 124 is determined based on an analysis of at least the respective content-inherent features and the user interest profile of the user 102.

Step 508: determining, for each of the first content item and the second content item, a completion parameter, the completion parameter being based, at least in part on the respective display feature, the completion parameter representing a degree of each of the first content channel and the second content channel meeting its respective number of displays At step 508 the prediction routine 306 is configured to determine the completion parameter of the first content item 122 and the second content item 124. The completion parameter represents a degree of each of the first content channel (which is associated with the first content item 122) and the second content channel (which is associated with the second content item 124) meeting its respective number of displays.

The manner in which the prediction routine 306 determines the completion parameter is not limited and may be done by analyzing one of two values, namely (i) an up-to-date displayed value; and (ii) a predictive completion parameter.

The manner in which the completion parameter is implemented is not limited, and may be represented as an absolute number of displays required to achieve the minimum display value, as a percentage value representing a rate of completing the minimum display value, and the like.

Step 510: ranking, by a ranking algorithm, the first content item and the second content item, based at least on their respective relevancy parameter and the completion parameter At step 510, the ranking routine 307 is configured to rank, using a first ranking algorithm 318, the first content item 122 and the second content item 124 based on their respective relevancy parameter and their respective completion parameter.

In some embodiments, the first and second ranking scores are determined using a linear combination of the completion parameter and the relevancy parameter of the associated content items.

The first ranking algorithm 318 is then configured to rank the first content item 122 and the second content item 124 based on their respective first ranking score and second ranking score.

Step 512: generating the digital content recommendation, the digital content recommendation including at least one of the first content item and the second content item that has been ranked by the ranking algorithm At step 512, the ranking routine 307 is configured to apply a predefined inclusion parameter indicative of an acceptable number of higher-ranked content items to be included within the digital content recommendation 214 for display.

Step 514: transmitting, by the server, the digital content recommendation to the electronic device for display At step 514, the recommendation server 112 is configured to transmit the data packet 324 to the electronic device 104. The data packet 324 comprises the digital content recommendation 214.

In response to receiving the data packet 324, the electronic device 104 displays the digital content recommendation 214 on the recommendation interface 108.

It should be apparent to those skilled in the art that at least some embodiments of the present technology aim to expand a range of technical solutions for addressing a particular technical problem encountered by the conventional content item recommendation systems, namely balancing the relevancy and the need for display of a given content item.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A method for generating a digital content recommendation, the digital content recommendation to be displayed on an electronic device associated with a user, the method being executed in a recommendation system connectable to the electronic device via a communication network, the recommendation system including a hardware server, the method comprising:

receiving, from the electronic device, via the communication network, a request for the digital content recommendation;

generating, a user interest profile of the user associated with the electronic device, the user interest profile being generated based on previously executed interactions of the user with the recommendation system, the user profile being represented with a set of vectors, wherein the user interest profile is generated based on a set of user interest profile features, the set of user interest profile features comprising at least one of:
a browsing history associated with the user;
a search history associated with the user;
user-specific preferences; or
a location of the electronic device;

selecting a set of candidate content items responsive to the request, the set of candidate content items including at least a first content item originating from a first content channel and a second content item originating from a second content channel, wherein:

each of the first content channel and the second content channel is associated with a respective display feature, the respective display feature for a given content channel corresponding to a predetermined minimum number of displays of one or more content items to a plurality of users of the recommendation system originating from the given content channel within a predetermined time period;

each of the first content item and the second content item being associated with a respective set of content item features, the set of content item features for a given content item comprising:
a total number of users of the recommendation system having previously accessed a given content channel associated with the given content item; and
one or more content items having been selected by the total number of users;

determining, for each of the first content item and the second content item, a relevancy parameter, the relevancy parameter for the given content item being determined by:
creating a histogram, the histogram representing a plurality of subsets each representing a subset of the total number of users, each of the subsets having a number of content items clicked by the subset of the number of users;
for a given subset, retrieving the user interest profile of the users included within the given subset;
generating, for the given subset, an average user profile, the average user profile corresponding to an average of the respective set of vectors of the users included within the given subset;
generating the relevancy parameter of the given content item, the relevancy parameter corresponding to a degree of similarity between the user interest profile of the user associated with the electronic device and the average user profile;

determining, for each of the first content item and the second content item, a completion parameter, the completion parameter for the given content item being determined by:
determining an up-to-date displayed value corresponding to a number of content items originating from the given content channel previously displayed to the total number of users; and
determining a predictive completion parameter corresponding to a number of content items from the given content channel associated with the given content item likely to be viewed within a given future timeframe by analyzing previous access by one or more electronic devices to the associated content channel in a previous corresponding timeframe; and determining the completion parameter corresponding to a difference between a sum of (i) the up-to-date displayed value and (ii) the predictive completion parameter, and the predetermined minimum number of displays;

ranking, by a ranking algorithm, the first content item and the second content item, based at least on their respective relevancy parameter and the completion parameter, the ranking comprising:
determining a first ranking score associated with the first content item, the first ranking score being determined based on the relevancy parameter associated with the first content item and the completion parameter of the first content item;
determining a second ranking score associated with the second content item, the second ranking score being determined based on the relevancy parameter associated with the second content item and the completion parameter of the second content item; and
ranking the first content item and the second content item based on the first ranking score and the second ranking score;

generating the digital content recommendation, the digital content recommendation including at least one of the first content item and the second content item that has been ranked by the ranking algorithm;

transmitting, by the server, the digital content recommendation to the electronic device associated with the user for display;

displaying the digital content recommendation on the electronic device associated with the user, the displaying comprising displaying a number of tiles, each tile of the number of tiles being associated with a respective content item included within the digital content recommendation, wherein the number of tiles is determined based on a size and resolution of a display screen of the electronic device associated with the user; and in response to the user selecting one of the first content item and the second content item, transmitting by the server to the electronic device associated with the user, a website associated with the selected one of the first content item and the second content item.

2. The method of claim 1, wherein the completion parameter is one of:
an absolute number of displays required to achieve the minimum display value; and
a percentage value representative of a rate of achieving the minimum display value.

3. The method of claim 1, wherein
the first content item is a first native content item native to the recommendation system, the first native content item originating from the first content channel that is native to the recommendation system;
the second content item is a second native content item, the second native content item originating from the second content channel that is native to the recommendation system;
the set of candidate content items further comprising one or more non-native content items that are non-native to the recommendation system, the one or more non-native content items being associated with a set of content item features; and
the method further comprising:
determining for each of the one or more non-native content items, a respective relevancy parameter.

4. The method of claim 3, wherein the ranking algorithm is a first ranking algorithm; and wherein the generating the digital content recommendation comprises:
ranking by a second ranking algorithm, the one or more non-native content items based at least on their respective relevancy parameter;
mixing, by a blending algorithm, the one or more non-native content items with the first native content item and the second native content item, the blending algorithm being configured to mutually rank the first native content item, the second native content item and the one or more non-native content items; and
selecting a subset of candidate content items by applying a predefined inclusion parameter indicative of an acceptable number of content items to be included within the digital content recommendation.

5. The method of claim 1, wherein the first content item and the second content item is at least one of:
an image;
a text; and
a video.

6. A system for generating a digital content recommendation, the digital content recommendation to be displayed on an electronic device associated with a user, the system comprising a hardware server connected to the electronic device via a communication network, the server comprising a processor configured to:
receive, from the electronic device, via the communication network, a request for the digital content recommendation;
generate a user interest profile of the user associated with the electronic device, the user interest profile being generated based on previously executed interactions of the user with the recommendation system, the user profile being represented with a set of vectors, wherein the user interest profile is generated based on a set of user interest profile features, the set of user interest profile features comprising at least one of:
a browsing history associated with the user;
a search history associated with the user;
user-specific preferences; or
a location of the electronic device;
select a set of candidate content items responsive to the request, the set of candidate content items including at least a first content item originating from a first content channel and a second content item originating from a second content channel, wherein:
each of the first content channel and the second content channel is associated with a respective display feature, the display feature for a given content channel corresponding to a predetermined minimum number of displays of one or more content items to a plurality of users of the recommendation system originating from the given content channel within a predetermined time period;
each of the first content item and the second content item being associated with a respective set of content item features, the set of content item features for a given content item comprising:
a total number of users of the recommendation system having previously accessed a given content channel associated with the given content item; and
one or more content items having been selected by the total number of users;

determine, for each of the first content item and the second content item, a relevancy parameter, the relevancy parameter for the given content item being determined by:
    creating a histogram, the histogram representing a plurality of subsets each representing a subset of the total number of users, each of the subsets having a number of content items clicked by the subset of the number of users;
    for a given subset, retrieving the user interest profile of the users included within the given subset;
    generating, for the given subset, an average user profile, the average user profile corresponding to an average of the respective set of vectors of the users included within the given subset;
    generating the relevancy parameter of the given content item, the relevancy parameter corresponding to a degree of similarity between the user interest profile of the user associated with the electronic device and the average user profile;
determine, for each of the first content item and the second content item, a completion parameter, the completion parameter for the given content item being determined by:
    determining an up-to-date displayed value corresponding to a number of content items originating from the given content channel previously displayed to the total number of users; and
    determining a predictive completion parameter corresponding to a number of content items from the given content channel associated with the given content item likely to be viewed within a given future timeframe by analyzing previous access by one or more electronic devices to the associated content channel in a previous corresponding timeframe; and
    determining the completion parameter corresponding to a difference between a sum of (i) the up-to-date displayed value and (ii) the predictive completion parameter, and the predetermined minimum number of displays;
rank, by a ranking algorithm, the first content item and the second content item, based at least on their respective relevancy parameter and the completion parameter, wherein to rank the first content item and the second content item, the processor is configured to:
    determine a first ranking score associated with the first content item, the first ranking score being determined based on the relevancy parameter associated with the first content item and the completion parameter of the first content item;
    determine a second ranking score associated with the second content item, the second ranking score being determined based on the relevancy parameter associated with the second content item and the completion parameter of the second content item; and
    rank the first content item and the second content item based on the first ranking score and the second ranking score;
generate the digital content recommendation, the digital content recommendation including at least one of the first content item and the second content item that has been ranked by the ranking algorithm; and
transmit, by the server, the digital content recommendation to the electronic device associated with the user for display, the displaying comprising displaying a number of tiles, each tile of the number of tiles being associated with a respective content item included within the digital content recommendation, wherein the number of tiles is determined based on a size and resolution of a display screen of the electronic device associated with the user;
display the digital content recommendation on the electronic device associated with the user; and
in response to the user selecting one of the first content item and the second content item, transmit by the server to the electronic device associated with the user, a website associated with the selected one of the first content item and the second content item.

7. The system of claim 6, wherein the completion parameter is one of:
    an absolute number of displays required to achieve the minimum display value; and
    a percentage value representative of a rate of achieving the minimum display value.

8. The system of claim 6, wherein
the first content item is a first native content item native to the recommendation system, the first native content item originating from the first content channel that is native to the recommendation system;
the second content item is a second native content item, the second native content item originating from the second content channel that is native to the recommendation system;
the set of candidate content items further comprising one or more non-native content items that are non-native to the recommendation system, the one or more non-native content items being associated with a set of content item features;
the processor being further configured to:
    determine for each of the one or more non-native content items, a respective relevancy parameter.

9. The system of claim 8, wherein the ranking algorithm is a first ranking algorithm: and wherein
to generate the digital content recommendation, the processor is configured to:
    rank by a second ranking algorithm, the one or more non-native content items based at least on their respective relevancy parameter;
    mix, by a blending algorithm, the one or more non-native content items with the first native content item and the second native content item, the blending algorithm being configured to mutually rank the first native content item, the second native content item and the one or more non-native content items; and
    select a subset of candidate content items by applying a predefined inclusion parameter indicative of an acceptable number of content items to be included within the digital content recommendation.

* * * * *